United States Patent
Ota

(10) Patent No.: US 10,553,860 B2
(45) Date of Patent: Feb. 4, 2020

(54) COVERED LITHIUM-NICKEL COMPOSITE OXIDE PARTICLES, AND METHOD FOR MANUFACTURING COVERED LITHIUM-NICKEL COMPOSITE OXIDE PARTICLES

(71) Applicant: SUMITOMO METAL MINING CO., LTD., Tokyo (JP)

(72) Inventor: Yosuke Ota, Chiba (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 31 days.

(21) Appl. No.: 15/318,785

(22) PCT Filed: Jun. 15, 2015

(86) PCT No.: PCT/JP2015/067144
§ 371 (c)(1),
(2) Date: Dec. 14, 2016

(87) PCT Pub. No.: WO2015/194497
PCT Pub. Date: Dec. 23, 2015

(65) Prior Publication Data
US 2017/0117540 A1     Apr. 27, 2017

(30) Foreign Application Priority Data

Jun. 20, 2014 (JP) .................................. 2014-127641
Jun. 20, 2014 (JP) .................................. 2014-127642

(51) Int. Cl.
*H01M 4/36* (2006.01)
*H01M 4/525* (2010.01)
(Continued)

(52) U.S. Cl.
CPC ........... *H01M 4/366* (2013.01); *H01M 4/525* (2013.01); *H01M 4/622* (2013.01); *H01M 4/624* (2013.01);
(Continued)

(58) Field of Classification Search
CPC ...... H01M 4/366; H01M 4/622; H01M 4/624; H01M 10/0525; H01M 4/525; H01M 2004/028
See application file for complete search history.

(56) References Cited

U.S. PATENT DOCUMENTS

| 6,436,572 | B1 | 8/2002 | Iyori | |
| 2005/0034993 | A1* | 2/2005 | Gozdz | ..................... H01M 4/13 205/57 |

(Continued)

FOREIGN PATENT DOCUMENTS

| CA | 2320501 A1 | 3/2001 |
| CN | 102714315 A | 10/2012 |

(Continued)

OTHER PUBLICATIONS

Extended European Search Report for counterpart EPC Patent Application No. 15810527.0, dated Nov. 14, 2017 (6 Sheets).
(Continued)

*Primary Examiner* — Lisa S Park
(74) *Attorney, Agent, or Firm* — Kratz, Quintos & Hanson, LLP

(57) ABSTRACT

Provided are exceptional covered lithium-nickel composite oxide particles that have lithium ion conductivity, the high environmental stability of said particles making it possible to inhibit the generation of impurities from the absorption of water and carbon dioxide; high adhesiveness also being achieved, and the coating layer not peeling off easily. The covered lithium-nickel composite oxide particles for the
(Continued)

positive electrode active material in a lithium ion cell, said particles being obtained by covering the surfaces of nickel-based lithium-nickel composite oxide particles with a polymer composition containing an electron-nonconductive polymer and an electron-conductive polymer, are covered nickel-based lithium-nickel composite oxide particles having excellent environmental stability and no adverse effect on cell characteristics.

9 Claims, 4 Drawing Sheets

(51) Int. Cl.
H01M 4/62 (2006.01)
H01M 10/0525 (2010.01)
H01M 4/02 (2006.01)

(52) U.S. Cl.
CPC .. *H01M 10/0525* (2013.01); *H01M 2004/028* (2013.01)

(56) References Cited

U.S. PATENT DOCUMENTS

| | | | |
|---|---|---|---|
| 2008/0166474 A1 | 7/2008 | Deguchi | |
| 2009/0194747 A1 | 8/2009 | Zou | |
| 2012/0077083 A1 | 3/2012 | Kageura | |
| 2012/0132849 A1 | 5/2012 | Fan | |
| 2012/0148901 A1* | 6/2012 | Okamoto | H01M 2/145 429/145 |
| 2012/0261610 A1 | 10/2012 | Paulsen | |
| 2012/0270104 A1* | 10/2012 | Paulsen | H01M 4/131 429/212 |
| 2014/0127576 A1* | 5/2014 | Kato | H01M 4/131 429/213 |
| 2014/0154572 A1* | 6/2014 | Singh | H01M 4/525 429/215 |

FOREIGN PATENT DOCUMENTS

| | | |
|---|---|---|
| CN | 103534843 A | 1/2014 |
| DE | 19946066 A1 | 3/2001 |
| JP | H06-076821 | 3/1994 |
| JP | 2000-223117 | 8/2000 |
| JP | 2011-511402 A1 | 4/2011 |
| JP | 2011-146360 | 7/2011 |
| JP | 2012-059410 A1 | 3/2012 |
| JP | 2012-094405 A1 | 5/2012 |
| JP | 2012-094406 A1 | 5/2012 |
| JP | 2013-179063 A1 | 9/2013 |
| WO | 2007/094240 A1 | 8/2007 |
| WO | 2011/019493 A1 | 2/2011 |

OTHER PUBLICATIONS

International Search Report for International Application No. PCT/JP2015/067144 dated Sep. 15, 2015.

Office Action of Chinese Patent Application No. 201580030393.3 dated Sep. 4, 2018 (10 sheets).

Office Action of Chinese Patent Application No. 201580030393.3 dated Jun. 20, 2019 (5 pages).

* cited by examiner

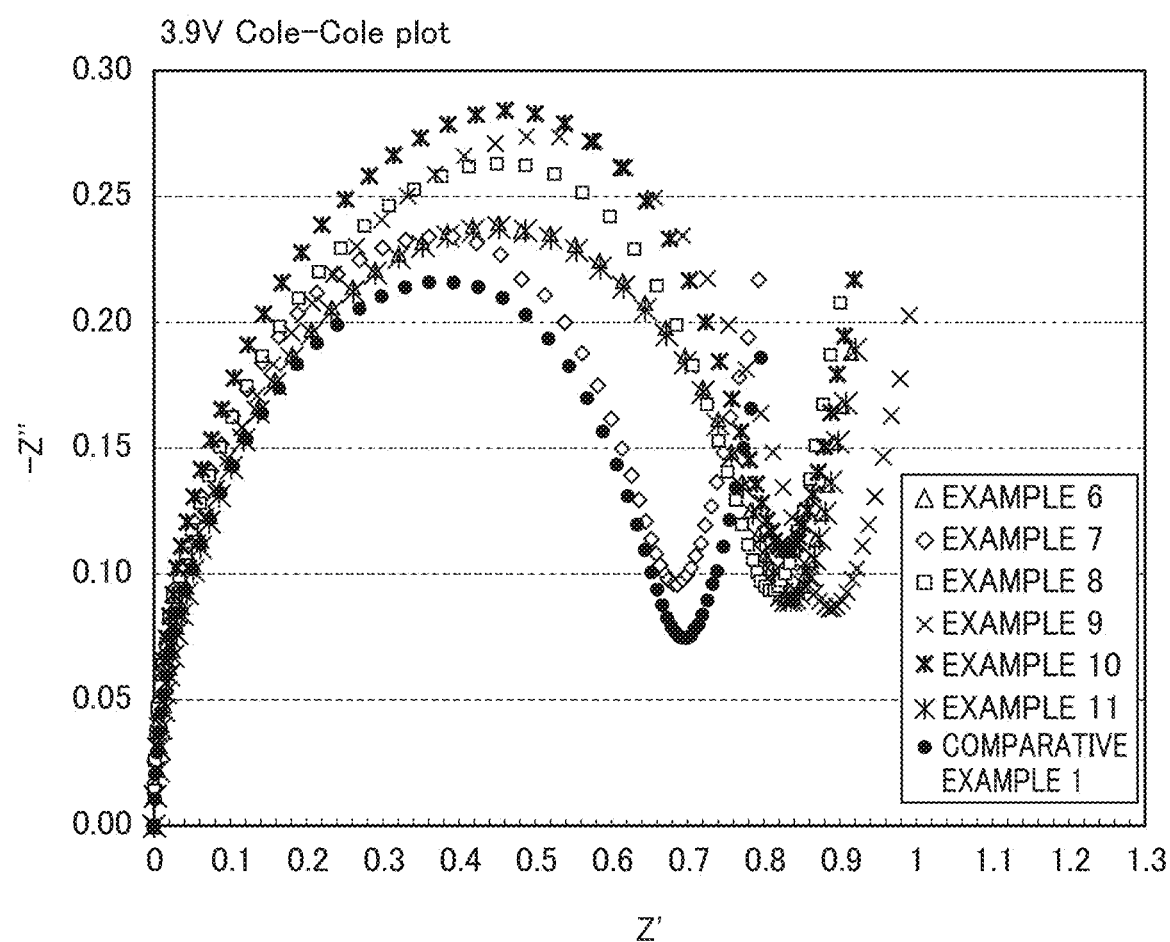

COVERED LITHIUM-NICKEL COMPOSITE OXIDE PARTICLES, AND METHOD FOR MANUFACTURING COVERED LITHIUM-NICKEL COMPOSITE OXIDE PARTICLES

TECHNICAL FIELD

The present invention relates to coated lithium-nickel composite oxide particles with a high content of nickel, and also relates to coated lithium-nickel composite oxide particles of which the stability under the atmosphere is improved and which is easy to handle, and a method for producing the coated lithium-nickel composite oxide particles.

BACKGROUND ART

In recent years, along with the rapid expansion of small-sized electronic devices such as cellular phones and laptop computers, a demand for a lithium-ion secondary battery as a chargeable and dischargeable power source has been rapidly increased. A lithium-cobalt oxide (hereinafter, sometimes also referred to as cobalt-based) has been widely used as a positive-electrode active substance contributing to the charging and discharging in a positive electrode of a lithium-ion secondary battery. However, capacity of the cobalt-based positive electrode has improved to the extent of theoretical capacity through the optimization of battery design, and higher capacity is becoming difficult to achieve.

Accordingly, lithium-nickel composite oxide particles using a lithium-nickel oxide that has the theoretical capacity higher than that of the conventional cobalt-based one has been developed. However, the pure lithium-nickel oxide has a problem in terms of safety, cycle characteristics, and the like because of the high reactivity with water, carbon dioxide, or the like, and is difficult to be used as a practical battery. Therefore, lithium-nickel composite oxide particles to which a transition metal element such as cobalt, manganese, and iron, or aluminum is added has been developed as an improvement measure for the problem described above.

In the lithium-nickel composite oxide, there are composite oxide particles expressed by a transition metal composition of $Ni_{0.33}Co_{0.33}Mn_{0.33}$, a so-called ternary composite oxide (hereinafter, sometimes referred to as ternary), which is made by adding nickel, manganese, and cobalt in an equimolar amount, respectively, and lithium-nickel composite oxide particles with a nickel content exceeding 0.65 mol, a so-called nickel-based composite oxide (hereinafter, sometimes referred to as nickel-based). From the viewpoint of capacity, a nickel-based with a large nickel content has a great advantage as compared to a ternary.

However, the nickel-based is characterized by being more sensitive depending on the environment as compared to a cobalt-based or a ternary, because of the high reactivity with water, carbon dioxide, and the like, and absorbing moisture and carbon dioxide ($CO_2$) in the air more easily. It has been reported that the moisture and carbon dioxide are deposited on particle surfaces as impurities such as lithium hydroxide (LiOH), and lithium carbonate ($Li_2CO_3$), respectively, and have an adverse effect on the production process of a positive electrode or battery performance.

By the way, the production process of a positive electrode passes through a process in which a positive electrode mixture slurry obtained by mixing lithium-nickel composite oxide particles, a conductive auxiliary, a binder, an organic solvent, and the like is applied onto a collector made of aluminum or the like, and dried. In general, in the production process of a positive electrode mixture slurry, lithium hydroxide causes the slurry viscosity to increase rapidly by reacting with a binder, and may cause gelation of the slurry. These phenomena cause faults and defects, and a decrease of production yield of a positive electrode, and may cause a variation in quality of the products. Further, during charging and discharging, these impurities react with an electrolytic solution and sometimes generate gas, and may cause a problem in the stability of the battery.

Accordingly, in a case where a nickel-based is used as a positive-electrode active substance, in order to prevent the generation of impurities such as the above-described lithium hydroxide (LiOH), the production process of a positive electrode is required to be performed in a dry (low humidity) environment in a decarbonated atmosphere. Therefore, there is a problem that in spite of having high theoretical capacity and showing great promise as a material of a lithium-ion secondary battery, the nickel-based requires high cost for the introduction of a facility and high running costs for the facility in order to maintain the production environment, and which becomes a barrier to it becoming widespread.

In order to solve the problem described above, a method of coating surfaces of lithium-nickel composite oxide particles by using a coating agent has been proposed. Such a coating agent is roughly classified as an inorganic coating agent and an organic coating agent. As the inorganic coating agent, a material such as titanium oxide, aluminum oxide, aluminum phosphate, cobalt phosphate, fumed silica, and lithium fluoride have been proposed, and as the organic coating agent, a material such as carboxymethyl cellulose, and a fluorine-containing polymer have been proposed.

For example, in Patent Document 1, a method of forming a lithium fluoride (LiF) or fluorine-containing polymer layer on surfaces of lithium-nickel composite oxide particles has been proposed, and in Patent Document 2, a method of forming a fluorine-containing polymer layer onto lithium-nickel composite oxide particles, and further adding a Lewis acid compound to neutralize impurities has been proposed. In any processing, the surfaces of lithium-nickel composite oxide particles are modified so as to have the hydrophobic property with a coated layer containing a fluorine-based material, and the adsorption of moisture is suppressed, and the deposition of impurities such as lithium hydroxide (LiOH) can be suppressed.

However, the coated layer containing the above-described fluorine-based material, which is used in these coating methods, is merely attached onto lithium-nickel composite oxide particles only by electrostatic attraction. Accordingly, the coated layer is redissolved in N-methyl-2-pyrrolidone (NMP), which is used as a solvent in the slurry production process, therefore, the coated layer is easily detached from the lithium-nickel composite oxide particles. As a result, the positive electrode is required to be stored in a dry (low humidity) environment in a decarbonated atmosphere, and not only cannot the faults and defects and the decrease of production yield, which are problems in the nickel-based, be suppressed, but also the problem with the stability of a battery substantially due to the generation of impurities cannot be thoroughly solved.

Patent Document 1: Japanese Unexamined Patent Application, Publication No. 2013-179063

Patent Document 2: Japanese Unexamined Patent Application (Translation of PCT Application), Publication No. 2011-511402

DISCLOSURE OF THE INVENTION

Problems to be Solved by the Invention

In view of the above-described problems of conventional technique, an object of the present invention is to provide coated lithium-nickel composite oxide particles that can be handled under the atmosphere and can obtain a coated film of an electronic conductor and a lithium ion conductor, the coated film not having an adverse effect on the battery characteristics, and a method for producing the coated lithium-nickel composite oxide particles.

Means for Solving the Problems

As a result of intensive studies to solve the above-described problems of conventional technique, the present inventors found coated nickel-based lithium-nickel composite oxide particles having improved stability in air and not exerting an adverse effect on the battery characteristics by coating surfaces of nickel-based lithium-nickel composite oxide particles with a polymer composition in which a non-electron conductive polymer having both the adsorption between particles and polymer and the ionic conductivity, and a conductive polymer having electron conductivity and ion conductivity have been mixed. Further, as for the coated lithium-nickel composite oxide particles, the coated layer does not peel off from the particle surfaces even when a positive electrode mixture slurry is kneaded. Accordingly, the present inventors have found suitable coated lithium-nickel composite oxide particles that can suppress the generation of impurities caused by moisture and carbon dioxide in the air when the produced positive electrode is stored, that is, can be handled in the atmosphere during the handing of materials, during the transportation, during the storage, during the preparation of electrodes and the production of batteries, and a method for producing the coated lithium-nickel composite oxide particles; and thus have completed the present invention.

That is, a first aspect of the present invention is coated lithium-nickel composite oxide particles for a lithium-ion battery positive-electrode active substance, including: coating surfaces of nickel-based lithium-nickel composite oxide particles with a polymer composition containing a non-electron conductive polymer and an electron conductive polymer.

A second aspect of the present invention is the coated lithium-nickel composite oxide particles according to the first aspect of the invention, in which the non-electron conductive polymer is a polymer or copolymer including at least one kind selected from the group consisting of a modified polyolefin resin, a polyester resin, a polyphenol resin, a polyurethane resin, an epoxy resin, a silane-modified resin, and a derivative thereof.

A third aspect of the present invention is the coated lithium-nickel composite oxide particles according to the second aspect of the invention, in which the silane-modified resin is a polymer or copolymer including at least one kind selected from the group consisting of a silane-modified polyether resin, a silane-modified polyester resin, a silane-modified polyphenol resin, a silane-modified polyurethane resin, a silane-modified epoxy resin, and a silane-modified polyamide resin.

A fourth aspect of the present invention is the coated lithium-nickel composite oxide particles according to any one of the first to third aspects of the invention, in which the electron conductive polymer is a polymer or copolymer including at least one kind selected from the group consisting of polypyrrole, polyaniline, polythiophene, poly(p-phenylene), polyfluorene, and a derivative thereof.

A fifth aspect of the present invention is the coated lithium-nickel composite oxide particles according to the first to fourth aspects of the invention, in which the non-electron conductive polymer is a polymer or copolymer including at least one kind selected from the group consisting of a modified polyolefin resin, a polyester resin, a polyphenol resin, a polyurethane resin, an epoxy resin, and a derivative thereof, and the coating amount of the polymer composition is 0.1 to 5.0% by mass relative to the lithium-nickel composite oxide particles.

A sixth aspect of the present invention is the coated lithium-nickel composite oxide particles according to the first to fourth aspects of the invention, in which the non-electron conductive polymer is a polymer or copolymer including a silane-modified resin or a derivative thereof, and the coating amount of the polymer composition is 0.05 to 5.0% by mass relative to the lithium-nickel composite oxide particles.

A seventh aspect of the present invention is the coated lithium-nickel composite oxide particles according to the first to sixth aspects of the invention, in which the content of the non-electron conductive polymer is 30 to 80% by mass relative to the total amount of the polymer composition.

An eighth aspect of the present invention is the coated lithium-nickel composite oxide particles according to any one of the first to seventh aspects of the invention, in which the lithium-nickel composite oxide is represented by the following Formula (1).

$$Li_xNi_{(1-y-z)}M_yN_zO_2 \quad (1)$$

(In the formula, x is a value of from 0.80 to 1.10, y is a value of from 0.01 to 0.20, z is a value of from 0.01 to 0.15, and 1-y-z is a value exceeding 0.65, and M represents at least one element selected from Co or Mn, and N represents at least one element selected from Al, In or Sn.)

A ninth aspect of the present invention is the coated lithium-nickel composite oxide particles according to the first to eighth aspects of the invention, in which the coated lithium-nickel composite oxide particles are spherical particles having an average particle diameter of 5 to 20 µm.

A tenth aspect of the present invention is a method for producing the coated lithium-nickel composite oxide particles according to the first to ninth aspects of the invention, including: preparing a resin solution for coating by dissolving a non-electron conductive polymer and an electron conductive polymer into a good solvent that dissolves the non-electron conductive polymer and electron conductive polymer; adding a poor solvent that does not dissolve the non-electron conductive polymer and the electron conductive polymer and has a evaporation rate lower than that of the good solvent into the resin solution for coating; adding the lithium-nickel composite oxide particles into the resin solution for coating to prepare a slurry; and removing the good solvent and the poor solvent from the slurry.

Effects of the Invention

In the present invention, by producing coated lithium-nickel composite oxide particles having a core of nickel-based lithium-nickel composite oxide particles and a shell formed of a polymer composition being a mixture of a non-electron conductive polymer and a conductive polymer on the core, excellent coated lithium-nickel composite oxide particles having both favorable electron conductivity and lithium ion conductivity on surfaces of the lithium-nickel composite oxide particles, and being coated with films that can suppress the permeation of moisture and carbon dioxide is provided, and a method for producing the coated lithium-nickel composite oxide particles is also provided.

The coated lithium-nickel composite oxide particles can be provided as a high capacity composite oxide positive-electrode active substance for a lithium-ion battery, for which production equipment that has been used for a cobalt-based, and ternary can also be used instead of positive-electrode production equipment in which carbon dioxide concentration and moisture concentration are strictly controlled.

BRIEF DESCRIPTION OF THE DRAWINGS

FIG. 4 shows a Cole-Cole plot by an impedance test before the cycle test in Examples 6 to 11 and Comparative Example.

PREFERRED MODE FOR CARRYING OUT THE INVENTION

Figure 1:
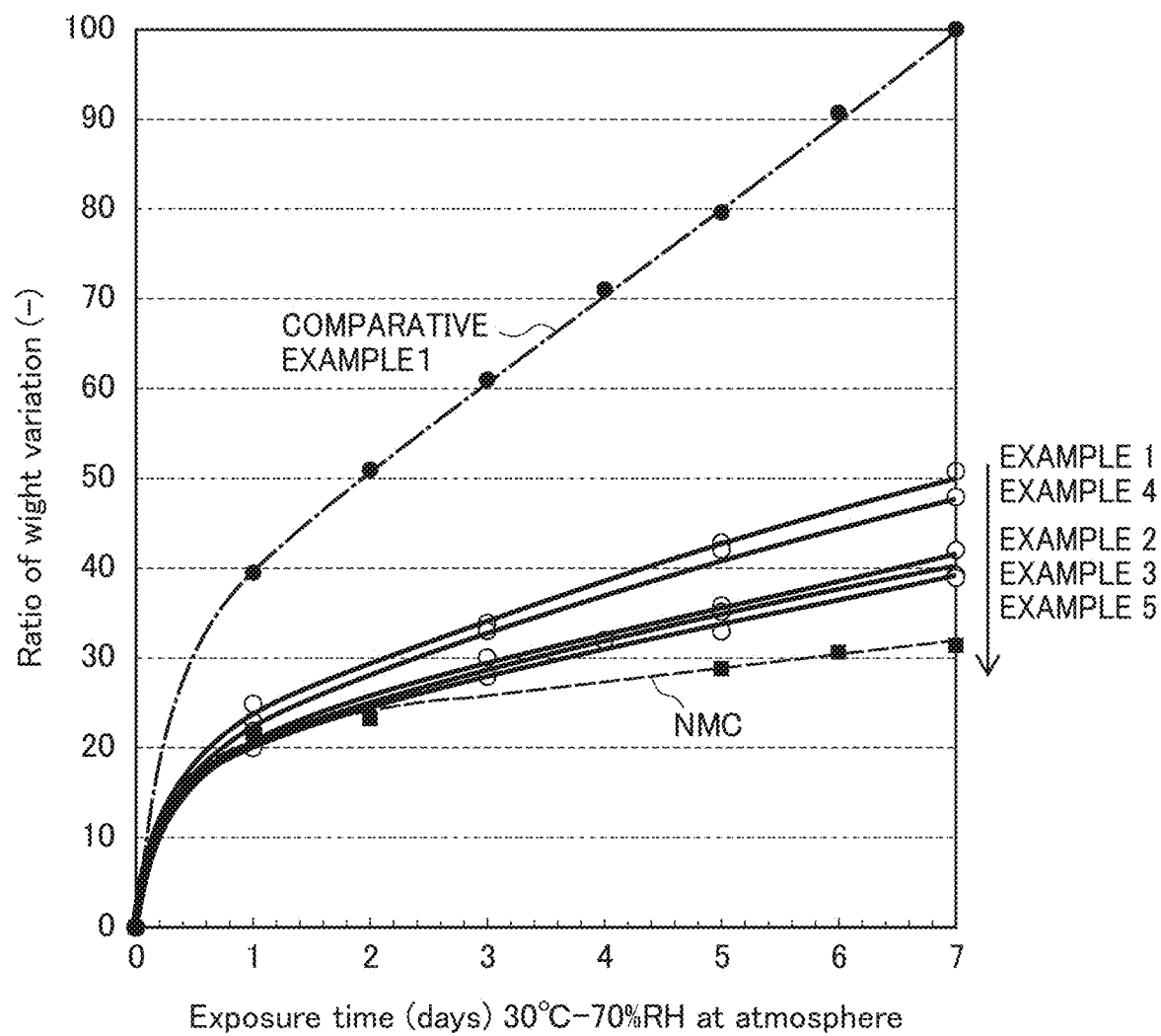
FIG. 1 shows a change rate per particles mass in a case after standing for one week in Examples 1 to 5 and Comparative Example.

Hereinafter, coated lithium-nickel composite oxide particles and a method for producing the same, according to the present invention, will be described in detail. However, the present invention should not be construed as being limited to the following detailed explanation. In the present invention, there may be a case where secondary particles aggregated with primary particles are referred to as the lithium-nickel composite oxide particles.

As the non-electron conductive polymer coating the particle surfaces, for example, a polymer or copolymer including at least one kind selected from the group consisting of a modified polyolefin resin, a polyester resin, a polyphenol resin, a polyurethane resin, an epoxy resin, a silane-modified resin, and a derivative thereof can be mentioned. The silane-modified resin is a polymer or copolymer in which a non-electron conductive polymer has been silane-modified, and as the silane-modified resin, for example, a polymer or copolymer including at least one kind selected from the group consisting of a silane-modified polyether resin, a silane-modified polyester resin, a silane-modified polyphenol resin, a silane-modified polyurethane resin, a silane-modified epoxy resin, a silane-modified polyamide resin, and a derivative thereof can be mentioned. As the electron conductive polymer coating the particle surfaces, for example, a mixture of a polymer or a copolymer including at least one kind selected from the group consisting of polypyrrole, polyaniline, polythiophene, poly(p-phenylene), polyfluorene, and a derivative thereof can be mentioned. The coated film formed of a polymer composition containing a non-electron conductive polymer and an electron conductive polymer has favorable electron conductivity and ion conductivity, therefore, does not exert an adverse effect on the battery characteristics. In addition, the coated lithium-nickel composite oxide particles coated with the polymer or copolymer is excellent in terms of environmental stability because the polymer or copolymer serves as the coated layer, and can be handled in a facility similar to that of the cobalt-based or the ternary. Accordingly, the present invention is coated lithium-nickel composite oxide particles having excellent environmental stability.

1. Non-Electron Conductive Polymer

[Modified Polyolefin Resin]

As the modified polyolefin resin contained in the coated films of the lithium-nickel composite oxide particles according to the present invention, for example, a modified polyolefin resin produced by modifying part of polyolefin by polymerizing α-olefin, or the like can be mentioned. Examples of the polyolefin resin include, for example, polyethylene, polypropylene, and an ethylene-propylene copolymer.

In general, polyolefin, such as polyethylene and polypropylene, has high crystallinity and no polarity, therefore, has no affinity for other substrates, for example, a resin having polarity such as a styrene resin, an acrylic resin, and a polyvinyl acetate resin, and has almost no affinity for a metal surface, glass, and an inorganic filler, either. Therefore, in order to coat or bond with a polyolefin resin, for example, there is a method of chlorinating polyolefin and using the chlorinated polyolefin as a primer, a method of imparting an affinity functional group to polyolefin and using the resultant polyolefin as a primer or a topcoat, or the like. Modified polyolefin to which a functional group having an affinity for the particles has been introduced is desirably used in a case of coating lithium-nickel composite oxide particles.

As a modifier that is used for a polyolefin resin used in the present invention, any modifier can be used as long as it can introduce a functional group having an affinity for the particles, and for example, (meth)acrylic acid, a derivative of (meth)acrylic acid, alkyl ester, glycidyl ester, an alkali metal salt of (meth)acrylic acid, a halide of (meth)acrylic acid, an amino group-containing (meth)acrylic acid derivative, di(meth)acrylate, an OH group or alkoxy group-containing (meth)acrylic acid derivative, an isocyanato group-containing (meth)acrylic acid derivative, a P-containing (meth)acrylic acid derivative, a nitrile compound, a vinyl compound, vinylbenzoic acid, a styrene derivative, dicarboxylic acid, a dicarboxylic acid anhydride, or the like can be mentioned.

As to the modified polyolefin produced according to the present invention, it is preferred that the modifier is graft-bonded to the main chain of polyolefin. In the present invention, as to the introduction amount of the modifier to polyolefin, that is, the modification amount, it is preferred that 0.5 to 100 modifier monomers are introduced, and more preferred that 1 to 50 modifier monomers are introduced, per polyolefin molecule chain.

As for the modification method of the modified polyolefin, for example, a known technique such as a method of being reacted in a solution state by using a radical reaction initiator in the presence of a solvent or without a solvent, a method of being reacted in a slurry state, or a method of being reacted in a molten state can be used for the production.

[Polyester Resin]

The polyester resin contained in the coated films of the lithium-nickel composite oxide particles according to the present invention is not particularly limited, and a known polyester can be used. The production of polyester may be performed by an esterification reaction, that is, a polycondensation reaction, and the reaction may be performed under either normal pressure or reduced pressure. Further, the adjustment of the molecular weight may be performed by appropriately adjusting the depressurized condition, and furthermore, a process of an addition reaction or the like by an acid anhydride such as a phthalic anhydride, a hexahydrophthalic anhydride, a maleic anhydride, and a succinic anhydride may be performed after the polycondensation reaction.

[Polyphenol Resin]

As the polyphenol resin contained in the coated films of the lithium-nickel composite oxide particles according to the present invention, for example, a novolak-type phenol resin obtained by a reaction of phenols and aldehydes in the presence of an acid catalyst, a resol-type phenol resin obtained by a reaction of phenols and aldehydes in the presence of an alkali catalyst, or the like can be used.

Further, various examples of the phenols include phenol, o-cresol, m-cresol, p-cresol, 2,3-xylenol, 2,4-xylenol, 2,5-xylenol, 2,6-xylenol, 3,4-xylenol, 3,5-xylenol, p-ethylphenol, p-isopropylphenol, p-tert-butylphenol, p-chlorophenol, or p-bromophenol. A formaldehyde generation source substance such as formalin, paraformaldehyde, trioxane, and tetraoxane can also be used as the aldehydes.

[Polyurethane Resin]

As the polyurethane resin contained in the coated films of the lithium-nickel composite oxide particles according to the present invention, those composed of a soft segment constituted by polymer polyol, and a hard segment constituted by diisocyanate, a chain extender, and as needed a chain terminator can be mentioned.

Various known examples such as polyester polyol, polycarbonate polyol, polyether polyol, and polyolefin polyol can be mentioned as the polymer polyol constituting the soft segment. The polymer polyol has a number average molecular weight in the range of from 500 to 10000, and preferably has a hydroxyl group at the molecular end. When the number average molecular weight is less than 500, there is a tendency that the stability is lowered along with the decrease of solubility, and when the number average molecular weight exceeds 10000, there is a tendency that the elasticity is lowered. In consideration of the physical properties of a cured product, the number average molecular weight is preferably in the range of from 1000 to 6000.

Examples of the polyester polyol include, for example, polyester polyols obtained by a dehydration condensation of various known saturated or unsaturated low molecular glycols such as ethylene glycol, diethylene glycol, triethylene glycol, 1,2-propanediol, 1,3-butanediol, 1,4-butanediol, neopentyl glycol, pentanediol, 3-methyl-1,5-pentanediol, 1,6-hexanediol, octane diol, 1,4-butynediol, and dipropylene glycol, alkyl glycidyl ethers such as n-butyl glycidyl ether, and 2-ethylhexyl glycidyl ether, or monocarboxylic acid glycidyl esters such as versatic acid glycidyl ester, with dibasic acid such as adipic acid, maleic acid, fumaric acid, a phthalic anhydride, isophthalic acid, terephthalic acid, succinic acid, oxalic acid, malonic acid, glutaric acid, pimelic acid, azelaic acid, sebacic acid, and suberic acid, an acid anhydride corresponding thereto, dimer acid, castor oil, or a fatty acid thereof; or polyester polyols obtained by a ring-opening polymerization of a cyclic ester compound. In addition, in a case of the polymer polyol obtained by a low molecular glycol and a dibasic acid, the glycols can be replaced with the following various polyols up to 5 mol %. For example, glycerin, trimethylol propane, trimethylolethane, 1,2,6-hexanetriol, 1,2,4-butanetriol, sorbitol, pentaerythritol, and the like can be mentioned.

The polycarbonatepolyol can be obtained, in general, by a known reaction such as a demethanol condensation reaction of polyhydric alcohol and dimethyl carbonate, a deurethane condensation reaction of polyhydric alcohol and diphenyl carbonate, or a deethylene glycol condensation reaction of polyhydric alcohol and ethylene carbonate. Examples of the polyhydric alcohol used in these reactions include various known saturated or unsaturated low molecular glycols such as 1,6-hexanediol, diethylene glycol, propylene glycol, 1,3-butanediol, 1,4-butanediol, neopentyl glycol, pentanediol, 3-methyl-1,5-pentanediol, octane diol, 1,4-butynediol, and dipropylene glycol, and alicyclic glycol such as 1,4-cyclohexane diglycol, and 1,4-cyclohexanedimethanol.

Examples of the polyether polyol include polyethylene glycol, polypropylene glycol, and polyoxytetramethylene glycol, which are obtained by a ring-opening polymerization of ethylene oxide, propylene oxide, tetrahydrofuran, or the like.

Examples of the polyolefin polyol include polybutadienepolyol or polyisoprenepolyol that has a hydroxyl group at the end, or those obtained by hydrogenating the polybutadienepolyol or polyisoprenepolyol.

Various known aromatic, aliphatic, or alicyclic diisocyanates can be used as the diisocyanate compound used for the hard segment that is a constituent component of a polyurethane resin. Representative examples of the diisocyanate compound include, for example, 1,5-naphthylene diisocyanate, 4,4'-diphenylmethane diisocyanate, 4,4'-diphenyl dimethylmethane diisocyanate, 4,4'-dibenzyl isocyanate, dialkyl diphenylmethane diisocyanate, tetraalkyl diphenylmethane diisocyanate, 1,3-phenylene diisocyanate, 1,4-phenylene diisocyanate, tolylene diisocyanate, butane-1,4-diisocyanate, hexamethylene diisocyanate, isopropylene diisocyanate, methylene diisocyanate, 2,2,4-trimethylhexamethylene diisocyanate, 2,4,4-trimethylhexamethylene diisocyanate, cyclohexane-1,4-diisocyanate, xylylene diisocyanate, hydrogenated xylylene diisocyanate, isophorone diisocyanate, lysine diisocyanate, dicyclohexylmethane-4,4'-diisocyanate, 1,3-bis(isocyanatemethyl)cyclohexane, methylcyclohexane diisocyanate, m-tetramethylxylylene diisocyanate, and dimer diisocyanate obtained by converting a carboxyl group of dimer acid to an isocyanate group.

Further, examples of the chain extender used for the polyurethane resin include, for example, low molecular glycols described in the above-described section for polyester polyol, glycols having a carboxyl group in the molecule such as dimethylol propionic acid, and dimethylol butanoic acid, polyamines such as ethylenediamine, propylenediamine, hexamethylenediamine, triethylenetetramine, diethylenetriamine, isophoronediamine, dicyclohexylmethane-4,4'-diamine, and dimer diamine obtained by converting a carboxyl group of dimer acid to an amino group, and polyamines having a carboxyl group in the molecule such as L-lysine, and L-arginine.

In addition, a polymerization terminator can also be used for a polyurethane resin in order to adjust the molecular weight. Examples of the polymerization terminator include, for example, alkyl monoamines such as di-n-butylamine, and n-butylamine, monoamines having a carboxyl group in the molecule such as D-alanine, and D-glutamic acid, alcohols such as ethanol, and isopropyl alcohol, and alcohols having a carboxyl group in the molecule such as glycolic acid.

[Epoxy Resin]

As the epoxy resin contained in the coated films of the lithium-nickel composite oxide particles according to the present invention, for example, those obtained by a reaction of bisphenols and a haloepoxide such as epichlorohydrin, or β-methylepichlorohydrin can be mentioned. Examples of the bisphenols include, for example, those obtained by a reaction of phenol or 2,6-dihalophenol and aldehydes or ketones such as formaldehyde, acetaldehyde, acetone, acetophenone, cyclohexanone, and benzophenone, and further those obtained by an oxidation of dihydroxyphenyl disulfide using a peroxy acid, an etherification reaction between hydroquinones, or the like.

[Silane-Modified Polyether Resin]

The silane-modified polyether resin contained in the coated films of the lithium-nickel composite oxide particles according to the present invention is not particularly limited, and a known silane-modified polyether can be used. As for the structure and production method of this silane-modified polyether resin, for example, the silane-modified polyether resin can also be obtained by a dealcoholization reaction of specific polyoxyalkylene glycol and a specific silicate compound in the presence or absence of a transesterification catalyst.

The specific polyoxyalkylene glycol is a homopolymer or copolymer obtained by the ring-opening polymerization of ethylene oxide, or propylene oxide, and both may also be a random polymer or a block polymer. The linear polyoxyalkylene glycol as described above can be used as needed in combination with a low-molecular polyol having 2 to 6 carbon atoms, a polyoxyalkylene compound having a hydroxyl group at one end, a polyoxyalkylene compound having a branch structure, or the like in the range of less than 10% by mass. Specific examples of the low-molecular polyol having around 2 to 6 carbon atoms include low-molecular glycols such as ethylene glycol, diethylene glycol, triethylene glycol, 1,2-propanediol, 1,3-propanediol, 1,3-butanediol, 1,4-butanediol, neopentyl glycol, pentanediol, 3-methyl-1,5-pentanediol, and 1,6-hexanediol, trihydric alcohol such as glycerin, butanetriol, pentanetriol, hexanetriol, trimethylolethane, and trimethylolpropane, tetrahydric or more alcohols such as pentaerythritol, and sorbitol, and a diol compound having a tertiary amino group such as N-methyl diethanolamine.

Examples of the polyoxyalkylene compound having a hydroxyl group at one end include polyethylene glycol, polypropylene glycol, and a poly(propylene glycol-ethylene glycol) copolymer, in which the one end has an acetyl group or an alkoxy group, and further the number average molecular weight is 3000 to 10000. The polyoxyalkylene compound is mainly used for the purpose of controlling the molecular weight and decreasing the viscosity of the alkoxysilane-modified polyether to be obtained.

Examples of the polyoxyalkylene compound having a branch structure include polyurethane obtained by reacting polypropylene glycol or a poly(propylene glycol-ethylene glycol) copolymer with triisocyanate, or polyoxyalkylene polyol obtained by introducing glycerin or pentaerythritol into a polymer chain and branching the chain.

A compound represented by the following Formula (2) is preferred as the specific silicate compound. Examples of the specific silicate compound include a hydrolyzable alkoxysilane monomer or polygomer represented by

$$R^1_m Si(OR^1)_{4-m} \qquad (2)$$

(in the formula, m represents an integer of 0 or 1, and $R^1$ represents an alkyl group or aryl group having 8 or less carbon atoms), and a silane coupling agent.

In the dealcoholization reaction, a catalyst is not necessarily required, but it is preferred to use a conventionally known transesterification catalyst for the purpose of the reaction promotion. Examples of the catalyst include, for example, an organic acid such acetic acid, para-toluenesulfonic acid, benzoic acid, and propionic acid; a metal such as lithium, sodium, potassium, rubidium, cesium, magnesium, calcium, barium, strontium, zinc, aluminum, titanium, cobalt, germanium, tin, lead, antimony, arsenic, cerium, boron, cadmium, and manganese; and an oxide, an organic acid salt, a halide, or an alkoxide of these metals. Among them, in particular, an organic acid, organic tin, and organic acid tin are preferred, and specifically acetic acid, dibutyltin dilaurate, or the like is effectively used.

In general, the use ratio of the polyoxyalkylene glycol A to the silicate compound B (A/B) is preferably in the range of 100/(2 to 40) in terms of mass ratio. In the use ratio (A/B), when the use amount of the silicate compound B is less than two, there is a tendency of leaving tack on the surface of the alkoxysilane-modified polyether cured product to be obtained, and on the other hand, when the use amount of the silicate compound B exceeds 40, the shrinkage at the time of curing of the alkoxysilane-modified polyether becomes large, and cracks may occur, therefore, both cases are not preferred.

[Silane-Modified Polyester Resin]

The silane-modified polyester resin contained in the coated films of the lithium-nickel composite oxide particles according to the present invention is not particularly limited, and a known silane-modified polyester can be used. As for the structure and production method of this silane-modified polyester resin, for example, the silane-modified polyether resin is obtained, for example, by reacting a polyester resin (I) with a specific alkoxysilane partial condensate (II).

A known polyester resin that has been prepared so as to have a carboxyl group at the molecular end can be used as the polyester resin (I), for example. The polyester resin (I) is synthesized by a known method, for example, a method of performing an esterification reaction of polyvalent carboxylic acids and polyhydric alcohols under the condition of excessive carboxylic acid groups, a method of obtaining a carboxyl group at the end by performing a ring-opening addition of an acid anhydride to a polyester resin having a hydroxyl group at the end obtained by an esterification reaction or a polycondensation reaction under the condition of excessive hydroxyl groups, or the like.

Examples of the polyvalent carboxylic acids that are constituents of the polyester resin (I) include, for example, an aliphatic or alicyclic dicarboxylic acids such as oxalic acid, malonic acid, succinic acid, glutaric acid, adipic acid, pimelic acid, suberic acid, sebacic acid, undecanedioic acid, dodecanedioic acid, tridecanedioic acid, a hexahydrophthalic anhydride, 1,4-cyclohexanedicarboxylic acid, 1,2-cyclohexanedicarboxylic acid, dimer acid, an acid anhydride thereof, or a lower alcohol esterification product thereof; aromatic dicarboxylic acids such as isophthalic acid, terephthalic acid, diphenylmethane-4,4'-dicarboxylic acid, an acid anhydride thereof, or a lower alcohol esterification product thereof. In addition, examples of the polyhydric alcohols include, for example, various known saturated or unsaturated low molecular glycols such as ethylene glycol, diethylene glycol, triethylene glycol, 1,2-propanediol, 1,3-propanediol, 1,3-butanediol, 1,4-butanediol, neopentyl glycol, pentanediol, 3-methyl-1,5-pentanediol, 1,6-hexanediol, octane diol, 1,4-butynediol, dipropylene glycol, and 1,4-cyclohexanedimethanol, diol obtained by hydrogenating dimer acid, and an ethylene oxide adduct of bisphenol A.

The reaction ratio of the above-described raw material components when the polyester resin (I) is synthesized is not particularly limited as long as being a ratio at which the carboxyl group and/or the acid anhydride group remains substantially at the molecular end. As the specific alkoxysilane partial condensate (II), a glycidyl ether group-containing alkoxysilane partial condensate (II) obtained by a dealcoholization reaction of an alkoxysilane partial condensate (II) and glycidol can be mentioned. As the alkoxysilane partial condensate (II), those obtained by hydrolyzing the hydrolyzable alkoxysilane monomer or silane coupling agent represented by the following Formula (2) in the presence of acid or alkali and water, and partially condensing the resultant hydrolyzate are used.

$$R^1_m Si(OR^1)_{4-m} \quad (2)$$

(in the formula, m represents an integer of 0 or 1, and $R^1$ represents an alkyl group or aryl group having 8 or less carbon atoms.)

Specific examples of the hydrolyzable alkoxysilane monomer include trialkoxysilanes such as tetramethoxysilane, tetraethoxysilane, methyltrimethoxysilane, methyltriethoxysilane, ethyltrimethoxysilane, ethyltriethoxysilane, n-propyltrimethoxysilane, n-propyltriethoxysilane, isopropyltrimethoxysilane, and isopropyltriethoxysilane.

As to the reaction of alkoxysilane partial condensate (II) and glycidol, for example, each of these components is charged, and the dealcoholization reaction is performed while heating and distilling off the generated alcohol. In the dealcoholization reaction, in order to promote the reaction, a catalyst that does not ring-open an oxirane ring can be used among the conventionally known catalysts. Examples of the catalyst include, for example, a metal such as lithium, sodium, potassium, rubidium, cesium, magnesium, calcium, barium, strontium, zinc, aluminum, titanium, cobalt, germanium, tin, lead, antimony, arsenic, cerium, boron, cadmium, and manganese; and an oxide, an organic acid salt, a halide, or an alkoxide of these metals. Among them, in particular, organic tin, and organic acid tin are preferred, and specifically dibutyltin dilaurate, tin octylate, or the like is effectively used.

The silane-modified polyester resin that is an intended product of the present invention can be obtained, for example, by a reaction of the polyester resin and the alkoxysilane partial condensate (II). The ratio of the oxirane group/the acid group is preferably 0.5 to 1.5. When the ratio is smaller than 0.5, the silica component is less, and there is a tendency that the high adhesion is difficult to obtain. When the ratio is larger than 1.5, the silica component is excessive, and there is a tendency that the cured film becomes brittle. This reaction is a ring-opening esterification reaction of the oxirane ring, generated mainly between the carboxyl group of the polyester resin and the glycidyl ether group of the alkoxysilane partial condensate (II). Herein, it can be considered that the alkoxy group itself of the alkoxysilane partial condensate (2) is consumed by moisture or the like that can exist in the reaction system, but in general, the alkoxy group is not involved in the ring-opening esterification reaction, therefore, 10% or more of the alkoxy group is left in the silane-modified polyester resin. The residual rate is preferably 80% or more.

[Silane-Modified Polyphenol Resin]

The silane-modified polyphenol resin coating the lithium-nickel composite oxide particles according to the present invention is not particularly limited, and a known silane-modified polyphenol can be used. Examples of the production method of the silane-modified polyphenol resin include, for example, a method of performing a condensation reaction of organopolysiloxane having alkoxy groups at both ends of the molecule chain and a phenol resin under heating, a method of performing a condensation reaction of organopolysiloxane having alkoxy groups or hydroxyl groups at both ends of the molecule chain and a phenol resin under heating, and a method of performing a dealcoholization reaction of a phenol resin (I) and a alkoxysilane partial condensate (II).

Both a novolak-type phenol resin obtained by a reaction of phenols and aldehydes in the presence of an acid catalyst, and a resol-type phenol resin obtained by a reaction of phenols and aldehydes in the presence of an alkali catalyst can be used as the above-described phenol resin (I).

Further, various examples of the phenols include, for example, phenol, o-cresol, m-cresol, p-cresol, 2,3-xylenol, 2,4-xylenol, 2,5-xylenol, 2,6-xylenol, 3,4-xylenol, 3,5-xylenol, p-ethylphenol, p-isopropylphenol, p-tert-butylphenol, p-chlorophenol, and p-bromophenol. For example, a formaldehyde generation source substance such as formalin, paraformaldehyde, trioxane, or tetraoxane can also be used as the aldehydes.

As the alkoxysilane partial condensate (II) used for the production of a silane-modified polyphenol resin, for example, an oligomer or the like obtained by the partial hydrolysis and condensation of the hydrolyzable alkoxysilane compound represented by Formula (3), or a silane coupling agent can be mentioned.

$$R^1_n Si(OR^1)_{4-n} \quad (3)$$

(in the formula, n represents an integer of 0 to 2, and each of $R^1$s is a lower alkyl group, an aryl group, or an unsaturated aliphatic residue, which may have a functional group directly bonded to a carbon atom, and may be the same as or different from each other.)

Examples of the hydrolyzable alkoxysilane compound represented by the above-described general formula include, for example, tetramethoxysilane, tetraethoxysilane, methyltrimethoxysilane, methyltriethoxysilane, ethyltrimethoxysilane, ethyltriethoxysilane, n-propyltrimethoxysilane, n-propyltriethoxysilane, isopropyltrimethoxysilane, isopropyltriethoxysilane, vinyltrimethoxysilane, vinyltriethoxysilane, 3-glycidoxypropyltrimethoxysilane, 3-glycidoxypropyltriethoxysilane, aminopropyltrimethoxysilane, aminopropyl triethoxysilane, phenyltrimethoxysilane, phenyltriethoxysilane, 3,4-epoxycyclohexylethyltrimethoxysilane, 3,4-epoxycyclohexylethyltriethoxysilane, dimethyldimethoxysilane, dimethyldiethoxysilane, diethyldimethoxysilane, and diethyldiethoxysilane.

In the dealcoholization reaction, in order to promote the reaction, a conventionally known transesterification catalyst of ester and a hydroxyl group can be used. Examples of the transesterification catalyst include, for example, an organic acid such as acetic acid, para-toluenesulfonic acid, benzoic acid, and propionic acid; a metal such as lithium, sodium, potassium, rubidium, cesium, magnesium, calcium, barium, strontium, zinc, aluminum, titanium, cobalt, germanium, tin, lead, antimony, arsenic, cerium, boron, cadmium, and manganese; and an oxide, an organic acid salt, a halide, or an alkoxide of these metals. Among them, in particular, an organic acid-based, organic tin, and organic acid tin are preferred, and specifically acetic acid, tin octylate, or dibutyltin dilaurate is effectively used.

The use ratio of the phenol resin (I) to the alkoxysilane partial condensate (II) in the silane-modified polyphenol resin according to the present invention is not particularly limited as long as being a ratio at which the phenolic hydroxyl group remains in the silane-modified phenol resin to be obtained. In general, the ratio (equivalent ratio) of the equivalent of the phenolic hydroxyl group of the phenol resin/the equivalent of the alkoxy group of the hydrolyzable alkoxysilane partial condensate is preferably in the range of from 0.2 to 10, and more preferably in the range of from 0.3 to 1.0. However, when the equivalent ratio is in the vicinity of one, the increase in viscosity and the gelation of the solution are easily generated due to the progress of the dealcoholization reaction, therefore, the progress of the dealcoholization reaction is required to be adjusted.

When the equivalent ratio is less than one, the proportion of the alkoxysilane partial condensate (II) in the silane-modified phenol resin to be obtained is high, therefore, the silica content is increased, and this is preferred from the viewpoint of the heat resistance, and the hardness. When the equivalent ratio becomes smaller, the phenolic hydroxyl group of the silane-modified phenol resin is decreased, therefore, curability is decreased, and a cured product having a sufficient crosslinking density tends to be hardly obtained. In consideration of these circumstances, the equivalent ratio is preferably 0.2 or more, and more preferably 0.3 or more.

[Silane-Modified Polyurethane Resin]

The silane-modified polyurethane resin contained in the coated films of the lithium-nickel composite oxide particles according to the present invention is not particularly limited, and a known silane-modified polyurethane can be used. As for the production method of this silane-modified polyurethane resin, for example, a method of obtaining from polymer polyol, diisocyanate, and a chain extender, and obtaining by a dealcoholization reaction of a polyurethane resin (I) having a functional group that has reactivity with an epoxy group, and an epoxy compound having one hydroxyl group in one molecule (hereinafter, simply abbreviated as "epoxy compound (A)") and an alkoxysilane partial condensate (II) can be mentioned.

The polyurethane resin (I) is composed of a soft segment constituted by polymer polyol, and a hard segment constituted by diisocyanate, a chain extender, and a chain terminator as needed.

The polymer polyol constituting the soft segment is not particularly limited, and various known ones such as polyester polyol, polycarbonate polyol, polyether polyol, and polyolefin polyol can be mentioned as this.

Examples of the polyester polyol include, for example, polyester polyols obtained by a dehydration condensation of various known saturated or unsaturated low molecular glycols such as ethylene glycol, diethylene glycol, triethylene glycol, 1,2-propanediol, 1,3-propanediol, 1,3-butanediol, 1,4-butanediol, neopentyl glycol, pentanediol, 3-methyl-1,5-pentanediol, 1,6-hexanediol, octane diol, 1,4-butynediol, and dipropylene glycol, alkyl glycidyl ethers such as n-butyl glycidyl ether, and 2-ethylhexyl glycidyl ether, or monocarboxylic acid glycidyl esters such as versatic acid glycidyl ester, with dibasic acid such as adipic acid, maleic acid, fumaric acid, a phthalic anhydride, isophthalic acid, terephthalic acid, succinic acid, oxalic acid, malonic acid, glutaric acid, pimelic acid, azelaic acid, sebacic acid, and suberic acid, an acid anhydride corresponding thereto, dimer acid, castor oil, or a fatty acid thereof; or polyester polyols obtained by a ring-opening polymerization of a cyclic ester compound. In addition, in a case of the polymer polyol obtained by a low molecular glycol and a dibasic acid, the glycols can be replaced with the following various polyols up to 5 mol %. For example, glycerin, trimethylol propane, trimethylolethane, 1,2,6-hexanetriol, 1,2,4-butanetriol, sorbitol, pentaerythritol, and the like can be mentioned.

The polycarbonatepolyol can be obtained, in general, by a known reaction such as a dealcoholization condensation reaction of polyhydric alcohol and dimethyl carbonate, a deurethane condensation reaction of polyhydric alcohol and diphenyl carbonate, or a deethylene glycol condensation reaction of polyhydric alcohol and ethylene carbonate. Examples of the polyhydric alcohol used in these reactions include various known saturated or unsaturated low molecular glycols such as 1,6-hexanediol, diethylene glycol, propylene glycol, 1,3-butanediol, 1,4-butanediol, neopentyl glycol, pentanediol, 3-methyl-1,5-pentanediol, octane diol, 1,4-butynediol, and dipropylene glycol, and alicyclic glycol such as 1,4-cyclohexane diglycol, and 1,4-cyclohexanedimethanol.

Examples of the polyether polyol include polyethylene glycol, polypropylene glycol, and polyoxytetramethylene glycol, which are obtained by a ring-opening polymerization of ethylene oxide, propylene oxide, tetrahydrofuran, or the like.

Examples of the polyolefin polyol include polybutadienepolyol or polyisoprenepolyol that has a hydroxyl group at the end, or those obtained by hydrogenating the polybutadienepolyol or polyisoprenepolyol.

Various known aromatic, aliphatic, or alicyclic diisocyanates can be used as the diisocyanate compound used for the hard segment that is a constituent component of a polyurethane resin (I). Representative examples of the diisocyanate compound include, for example, 1,5-naphthylene diisocyanate, 4,4'-diphenylmethane diisocyanate, 4,4'-diphenyl dimethylmethane diisocyanate, 4,4'-dibenzyl isocyanate, dialkyl diphenylmethane diisocyanate, tetraalkyl diphenylmethane diisocyanate, 1,3-phenylene diisocyanate, 1,4-phenylene diisocyanate, tolylene diisocyanate, butane-1,4-diisocyanate, hexamethylene diisocyanate, isopropylene diisocyanate, methylene diisocyanate, 2,2,4-trimethylhexamethylene diisocyanate, 2,4,4-trimethylhexamethylene diisocyanate, cyclohexane-1,4-diisocyanate, xylylene diisocyanate, hydrogenated xylylene diisocyanate, isophorone diisocyanate, lysine diisocyanate, dicyclohexylmethane-4,4'-diisocyanate, 1,3-bis(isocyanatemethyl) cyclohexane, methylcyclohexane diisocyanate, m-tetramethylxylylene diisocyanate, and dimer diisocyanate obtained by converting a carboxyl group of dimer acid to an isocyanate group.

Examples of the chain extender used for the polyurethane resin (I) include, for example, low molecular glycols described in the section for polyester polyol; glycols having a carboxyl group in the molecule such as dimethylol propionic acid, and dimethylol butanoic acid; polyamines such as ethylenediamine, propylenediamine, hexamethylenediamine, triethylenetetramine, diethylenetriamine, isophoronediamine, dicyclohexylmethane-4,4'-diamine, and dimer diamine obtained by converting a carboxyl group of dimer acid to an amino group; and polyamines having a carboxyl group in the molecule such as L-lysine, and L-arginine.

Further, a polymerization terminator can also be used for a polyurethane resin (I) as needed in order to adjust the molecular weight. Examples of the polymerization terminator include, for example, alkyl monoamines such as di-n-butylamine, and n-butylamine; monoamines having a carboxyl group in the molecule such as D-alanine, and D-glutamic acid; alcohols such as ethanol, and isopropyl alcohol; and alcohols having a carboxyl group in the molecule such as glycolic acid.

As the method of producing the polyurethane resin (I), a one-step method in which a polymer polyol, a diisocyanate compound, a chain extender and/or polymerization terminator are reacted with one another at one time in an appropriate solvent; a two-step method in which a polymer polyol and a diisocyanate compound are reacted with each other under the condition of excessive isocyanate groups to prepare a prepolymer having an isocyanate group at the end of the polymer polyol, and then the prepolymer is reacted in an appropriate solvent with a chain extender, and as needed a polymerization terminator; or the like can be mentioned.

As to the epoxy compound (A), the number of epoxy groups is not particularly limited as long as the epoxy compound has one hydroxyl group in one molecule. In addition, as for the epoxy compound (A), the smaller the molecular weight is, the better the compatibility with the alkoxysilane partial condensate (II) is and the higher the effect of imparting the heat resistance and the adhesion is, therefore, an epoxy compound having 15 or less carbon atoms is suitable. Specific examples of the epoxy compound (A) include monoglycidyl ethers having one hydroxyl group at the molecular end, which is obtained by reacting epichlorohydrin with water, dihydric alcohol, or phenols; polyglycidyl ethers having one hydroxyl group at the molecular end, which is obtained by reacting epichlorohydrin with polyhydric alcohol that is trihydric or more alcohol such as glycerin, or pentaerythritol; an epoxy compound having one hydroxyl group at the molecular end, which is obtained by reacting epichlorohydrin with amino monoalcohol; and an alicyclic hydrocarbon monoepoxide having one hydroxyl group in the molecule (for example, epoxidized tetrahydrobenzyl alcohol). Among these epoxy compounds, glycidol is the most excellent in view of the effect of imparting heat resistance, and has higher reactivity with an alkoxysilane partial condensate (2), and therefore, is most suitable.

The alkoxysilane partial condensate (II) is an oligomer obtained by partially hydrolyzing and condensing a hydrolyzable alkoxysilane compound represented by the following Formula (3).

$$R^1{}_n Si(OR^1)_{4-n} \qquad (3)$$

(in the formula, n represents an integer of 0 to 2, and each of $R^1$s is a lower alkyl group, an aryl group, or an unsaturated aliphatic residue, which may have a functional group directly bonded to a carbon atom, and may be the same as or different from each other.)

Specific examples of the hydrolyzable alkoxysilane monomer include tetraalkoxysilanes such as tetramethoxysilane, tetraethoxysilane, tetrapropoxysilane, and tetraisopropoxysilane; and trialkoxysilanes such as methyltrimethoxysilane, methyltriethoxysilane, methyltripropoxysilane, methyltributoxysilane, ethyltrimethoxysilane, ethyltriethoxysilane, n-propyltrimethoxysilane, n-propyltriethoxysilane, isopropyltrimethoxysilane, and isopropyltriethoxysilane. In addition, those as described above can be used as the alkoxysilane partial condensate (II) without any particular limitation.

The silane-modified polyurethane resin can be produced, for example, by a dealcoholization reaction of an epoxy compound (A) and an alkoxysilane partial condensate (II). In the dealcoholization reaction, in order to promote the reaction, a catalyst that does not serve for a ring-opening of an epoxy ring can be used as needed among the conventionally known catalysts. Examples of the catalyst include, for example, a metal such as lithium, sodium, potassium, rubidium, cesium, magnesium, calcium, barium, strontium, zinc, aluminum, titanium, cobalt, germanium, tin, lead, antimony, arsenic, cerium, boron, cadmium, and manganese; and an oxide, an organic acid salt, a halide, or an alkoxide of these metals. Among them, in particular, organic tin, and organic acid tin are preferred, and specifically dibutyltin dilaurate, tin octylate, or the like is effectively used.

The alkoxy group-containing silane-modified polyurethane resin composition is preferably synthesized, for example, by performing the reaction by heating substantially in an anhydrous state. The main purpose of the present reaction is a reaction of an acidic group and/or an amino group of a polyurethane resin (I) and an oxirane group of the epoxy group-containing alkoxysilane partial condensate (II), and this is because of the need to suppress the generation of silica by the sol-gel reaction at the alkoxysilyl portion of the epoxy group-containing alkoxysilane partial condensate (II) in the present reaction.

In addition, in the above-described reaction, a catalyst is not particularly required, but in order to promote the reaction, a conventionally known catalyst can also be used as needed. Examples of the catalyst include, for example, tertiary amines such as 1,8-diazabicyclo[5.4.0]undecene-7, triethylenediamine, benzyldimethylamine, triethanolamine, dimethylaminoethanol, and tris(dimethylaminomethyl)urethane; imidazoles such as 2-methylimidazole, 2-phenylimidazole, 2-phenyl-4-methylimidazole, and 2-heptadecylimidazole; organic phosphines such as tributylphosphine, methyldiphenylphosphine, triphenylphosphine, diphenylphosphine, and phenylphosphine; and a tetraphenylboron salt such as tetraphenylphosphonium.tetraphenylborate, 2-ethyl-4-methylimidazole.tetraphenylborate, and N-methylmorpholine.tetraphenylborate.

Further, the above-described reaction can be performed in a solvent or in the absence of a solvent in accordance with the intended use. The solvent is not particularly limited as long as being a solvent dissolving the polyurethane resin (I) and the epoxy group-containing alkoxysilane partial condensate (II).

The use ratio of the polyurethane resin (I) to the epoxy group-containing alkoxysilane partial condensate (II) is not particularly limited, but the ratio (equivalent ratio) of the equivalent of the epoxy group of the epoxy group-containing alkoxysilane partial condensate (II)/the total equivalent of the epoxy group-reactive functional group of the polyurethane resin (I) is preferably in the range of from 0.30 to 5. When the use ratio is less than 0.30, the alkoxy group-containing silane-modified polyurethane resin to be obtained does not sufficiently exert the effect of the present invention, and when the use ratio exceeds 5, the proportion of the unreacted epoxy group-containing alkoxysilane partial condensate (II) in the alkoxy group-containing silane-modified polyurethane resin is increased, therefore, this is not preferred.

[Silane-Modified Epoxy Resin]

The silane-modified epoxy resin contained in the coated films of the lithium-nickel composite oxide particles according to the present invention is not particularly limited, and a known silane-modified epoxy can be used. As the production method of the silane-modified epoxy resin, for example, there is a method of modifying part or the entire part of the hydroxyl groups of the bisphenol-type epoxy resin (I) by a dealcoholization reaction with an alkoxysilane partial condensate (II).

As the bisphenol-type epoxy resin (I), those obtained by a reaction of bisphenols and a haloepoxide such as epichlorohydrin, or β-methylepichlorohydrin can be mentioned. Examples of the bisphenols include those obtained by a reaction of phenol or 2,6-dihalophenol and aldehydes or ketones such as formaldehyde, acetaldehyde, acetone, acetophenone, cyclohexanone, and benzophenone, and further those obtained by an oxidation of dihydroxyphenyl disulfide using a peroxy acid, an etherification reaction between hydroquinones, or the like.

Further, the bisphenol-type epoxy resin (I) has a hydroxyl group capable of performing an esterification reaction with the alkoxysilane partial condensate (II). As for the hydroxyl group, each molecule constituting the bisphenol-type epoxy resin (I) is not required to have the hydroxyl group, but the bisphenol-type epoxy resin (1) is only required to have the hydroxyl group. Furthermore, the bisphenol-type epoxy resin (I) can also be used in combination with an epoxy compound having reactivity with the alkoxysilane partial condensate (II). As the epoxy compound, a glycidyl ester-type epoxy resin obtained by a reaction of polybasic acids such as phthalic acid and dimer acid, and epichlorohydrin; glycidol; or the like can be mentioned.

In general, those used in a sol-gel method can be used as the alkoxysilane partial condensate (II). For example, a compound represented by the general formula: $R^1_p Si(OR^2)_{4-p}$ (in the formula, p represents an integer of 0 to 2, and $R^1$ is an alkyl group, an aryl group, or an unsaturated aliphatic residue, which has 6 or less carbon atoms and may have a functional group directly bonded to a carbon atom, and may be the same as or different from each other. $R^2$ represents a lower alkyl group.), or a condensate thereof can be mentioned. In addition, the alkyl group may be either a straight chain or a branched chain. Further, a silane coupling agent may be used as the alkoxysilane partial condensate (II).

Specific examples of the alkoxysilane partial condensate (II) include tetraalkoxysilanes such as tetramethoxysilane, tetraethoxysilane, tetrapropoxysilane, tetraisopropoxysilane, and tetrabutoxysilane; alkyltrialkoxysilanes such as methyltrimethoxysilane, methyltriethoxysilane, methyltripropoxysilane, methyltributoxysilane, ethyltrimethoxysilane, ethyltriethoxysilane, n-propyltrimethoxysilane, n-propyltriethoxysilane, isopropyltrimethoxysilane, and isopropyltriethoxysilane; aryltrialkoxysilanes such as phenyltrimethoxysilane, and phenyltriethoxysilane; functional group-containing trialkoxysilanes such as vinyltrimethoxysilane, vinyltriethoxysilane, 3-glycidoxypropyltrimethoxysilane, 3-glycidoxypropyltriethoxysilane, 3-mercaptopropyltrimethoxysilane, 3-mercaptopropyltriethoxysilane, 3,4-epoxycyclohexyl ethyltrimethoxysilane, and 3,4-epoxycyclohexyl ethyltrimethoxysilane; dialkoxysilanes such as dimethyldimethoxysilane, dimethyldiethoxysilane, diethyldimethoxysilane, and diethyldiethoxysilane; or a condensate thereof.

The silane-modified epoxy resin can be produced by esterifying, for example, the bisphenol-type epoxy resin (I) and the alkoxysilane partial condensate (II) by the dealcoholization reaction.

In the transesterification reaction, in order to promote the reaction, a catalyst that does not serve for a ring-opening of an epoxy ring can be used among the conventionally known transesterification catalysts of ester and hydroxyl group. Examples of the transesterification catalyst include, for example, a metal such as lithium, sodium, potassium, rubidium, cesium, magnesium, calcium, barium, strontium, zinc, aluminum, titanium, cobalt, germanium, tin, lead, antimony, arsenic, cerium, boron, cadmium, and manganese; and an oxide, an organic acid salt, a halide, or an alkoxide of these metals. Among them, in particular, organic tin and organic acid tin are preferred, and specifically dibutyltin dilaurate is effectively used.

The silane-modified epoxy resin is used in various applications, and in general, used as a silane-modified epoxy resin composition in combination with a curing agent. In addition, in using the silane-modified epoxy resin composition in various applications, various epoxy resins can also be used in combination depending on the application. Examples of the epoxy resin that can be used in combination with a silane-modified epoxy resin include a novolac type epoxy resin such as a bisphenol-type epoxy resin (I) used in the present invention, an ortho-cresol novolak-type epoxy resin, and a phenol novolak-type epoxy resin; a glycidyl ester-type epoxy resin obtained by a reaction of polybasic acids such as phthalic acid and dimer acid, and epichlorohydrin; a glycidylamine-type epoxy resin obtained by a reaction of polyamines such as diaminodiphenylmethane and isocyanuric acid, and epichlorohydrin; and a linear aliphatic epoxy resin and an alicyclic epoxy resin, which are obtained by oxidizing an olefin bond with a peroxy acid such as peracetic acid.

In addition, as the curing agent, in general, a phenol resin-based curing agent, a polyamine-based curing agent, a polycarboxylic acid-based curing agent, or the like, which is used as a curing agent for an epoxy resin, can be used without any particular limitation. Specific examples of the phenol resin-based curing agent include a phenol novolak resin, a bisphenol novolak resin, and a poly(p-vinylphenol). Specific examples of the polyamine-based curing agent include diethylenetriamine, triethylenetetramine, tetraethylenepentamine, dicyandiamide, polyamideamine (a polyamide resin), a ketimine compound, isophoronediamine, m-xylylenediamine, m-phenylenediamine, 1,3-bis(aminomethyl)cyclohexane, N-aminoethylpiperazine, 4,4'-diamino diphenylmethane, 4,4'-diamino-3,3'-diethyl diphenylmethane, and diaminodiphenylsulfone. Specific examples of the polycarboxylic acid-based curing agent include a phthalic anhydride, a tetrahydrophthalic anhydride, a methyl tetrahydrophthalic anhydride, a 3,6-endomethylene tetrahydrophthalic anhydride, a hexachloroendomethylene tetrahydrophthalic anhydride, and a methyl-3,6-endomethylene tetrahydrophthalic anhydride.

In the above-described epoxy resin composition, a curing accelerator can be contained in order to promote the curing reaction of an epoxy resin and a curing agent. Examples of the curing accelerator include, for example, tertiary amines such as 1,8-diazabicyclo(5,4,0)undecene-7, triethylenediamine, benzyldimethylamine, triethanolamine, dimethylaminoethanol, and tris(dimethylaminomethyl)phenol; imidazoles such as 2-methylimidazole, 2-phenylimidazole, 2-phenyl-4-methylimidazole, and 2-heptadecylimidazole; organic phosphines such as tributylphosphine, methyldiphenylphosphine, triphenylphosphine, diphenylphosphine, and phenylphosphine; and a tetraphenylboron salt such as tetraphenylphosphonium.tetraphenylborate, 2-ethyl-4-methylimidazole.tetraphenylborate, and N-methylmorpholine.tetraphenylborate.

The silane-modified epoxy resin of the present invention can be produced by esterifying, for example, the bisphenol-type epoxy resin (I) and the alkoxysilane partial condensate (II) by the dealcoholization reaction. The use ratio of the bisphenol-type epoxy resin (I) to the alkoxysilane partial condensate (II) is not particularly limited, but the mass ratio of the mass (in terms of silica) of the alkoxysilane partial condensate (II)/the mass of the bisphenol-type epoxy resin (I) is preferably in the range of from 0.01 to 1.2.

[Silane-Modified Polyamide Resin]

The silane-modified polyamide resin contained in the coated films of the lithium-nickel composite oxide particles according to the present invention is not particularly limited, and a known silane-modified polyamide can be used. As to the constitutive substance and production method of this silane-modified polyamide resin, the silane-modified polyamide resin is, for example, a resin composition containing alkoxy group-containing silane-modified polyamic acid that is obtained by reacting part of a carboxyl group of polyamic acid (I) with an epoxy group-containing alkoxysilane partial condensate (II), and can be produced through a dealcoholization reaction. In addition, part or most of the polyamic acid may be imidized by a dehydration reaction.

The polyamic acid (I) is a resin in which adjacent carbon atoms in the skeleton of amide bond molecule have a carboxyl group and an amide group, respectively in the molecule, and a polyamic acid solution obtained by reacting tetracarboxylic acids with diamines usually at −20° C. to 60° C. in a polar solvent can be used as the polyamic acid (I), for example. The molecular weight of the polyamic acid (I) is not particularly limited, but the number average molecular weight is preferably around 3000 to 50000.

Examples of the above-described tetracarboxylic acid include, for example, a pyromellitic acid anhydride, a 1,2,3,4-benzenetetracarboxylic anhydride, a 1,4,5,8-naphthalenetetracarboxylic acid anhydride, a 2,3,6,7-naphthalenetetracarboxylic acid anhydride, a 3,3',4,4'-biphenyltetracarboxylic acid dianhydride, a 2,2',3,3'-biphenyltetracarboxylic acid dianhydride, a 2,3,3',4'-biphenyltetracarboxylic acid dianhydride, a 3,3',4,4'-benzophenonetetracarboxylic acid dianhydride, a 2,3,3',4'-benzophenonetetracarboxylic acid dianhydride, a 3,3',4,4'-diphenylether tetracarboxylic dianhydride, a 2,3,3',4'-diphenylether tetracarboxylic dianhydride, a 3,3',4,4'-diphenylsulfone tetracarboxylic dianhydride, a 2,3,3',4'-diphenylsulfone tetracarboxylic dianhydride, a 2,2-bis(3,3',4,4'-tetracarboxyphenyl)tetrafluoropropane dianhydride, a 2,2'-bis(3,4-dicarboxyphenoxyphenyl)sulfone dianhydride, a 2,2-bis(2,3-dicarboxyphenyl)propane dianhydride, a 2,2-bis(3,4-dicarboxyphenyl)propane dianhydride, a cyclopentane tetracarboxylic anhydride, a butane-1,2,3,4-tetracarboxylic acid, and a 2,3,5-tricarboxycyclopentylacetic acid anhydride, and these are used singly alone or in combination of two or more kinds thereof.

In addition, tricarboxylic acids such as a trimellitic acid anhydride, butane-1,2,4-tricarboxylic acid, and naphthalene-1,2,4-tricarboxylic acid; aliphatic dicarboxylic acids such as oxalic acid, malonic acid, succinic acid, glutaric acid, adipic acid, pimelic acid, suberic acid, sebacic acid, undecanedioic acid, dodecanedioic acid, and tridecanedioic acid, and an acid anhydride thereof; and aromatic dicarboxylic acids such as isophthalic acid, terephthalic acid, and diphenylmethane-4,4'-dicarboxylic acid, and an acid anhydride thereof can be used in combination.

Examples of the above-described diamines include 4,4'-diaminodiphenyl ether, 3,4'-diaminodiphenyl ether, 4,4'-diaminophenyl methane, 3,3'-dimethyl-4,4'-diaminodiphenyl methane, 4,4'-diaminodiphenyl sulfone, 4,4'-di(m-aminophenoxy)diphenylsulfone, 4,4'-diaminodiphenyl sulfide, 1,4-diamino benzene, 2,5-diaminotoluene, isophoronediamine, 4-(2-aminophenoxy)-1,3-diamino benzene, 4-(4-aminophenoxy)-1,3-diamino benzene, 2-amino-4-(4-aminophenyl)thiazole, 2-amino-4-phenyl-5-(4-aminophenyl)thiazole, benzidine, 3,3',5,5'-tetramethylbenzidine, octafluoro benzidine, o-tolidine, m-tolidine, p-phenylenediamine, m-phenylenediamine, 1,2-bis(anilino)ethane, 2,2-bis(p-aminophenyl)propane, 2,2-bis(p-aminophenyl) hexafluoropropane, 2,6-diaminonaphthalene, diaminobenzotrifluoride, 1,4-bis(p-aminophenoxy)benzene, 4,4'-bis(p-aminophenoxy)biphenyl, diaminoanthraquinone, 1,3-bis(anilino)hexafluoropropane, 1,4-bis(anilino)octafluoropropane, and 2,2-bis[4-(p-aminophenoxy)phenyl] hexafluoropropane, and these are used singly alone or in combination of two or more kinds thereof.

As the epoxy group-containing alkoxysilane partial condensate (II), those that are obtained by a dealcoholization reaction of an epoxy compound having one hydroxyl group in one molecule (hereinafter, simply referred to as "epoxy compound (A)") and an alkoxysilane partial condensate (2) can be mentioned.

As for the epoxy compound (A), the number of epoxy groups is not particularly limited as long as the epoxy compound (A) has one hydroxyl group in one molecule. In addition, as to the epoxy compound (A), the smaller the molecular weight is, the better the compatibility with the alkoxysilane partial condensate (II) is and the higher the effect of imparting the heat resistance and the adhesion is, therefore, those having 15 or less carbon atoms are suitable. Specific examples of the epoxy compound (A) include monoglycidyl ethers having one hydroxyl group at the molecular end, which are obtained by reacting epichlorohydrin with water, dihydric alcohol, or phenols having two hydroxyl groups; polyglycidyl ethers having one hydroxyl group at the molecular end, which are obtained by reacting epichlorohydrin with polyhydric alcohol that is trihydric or more alcohol such as glycerin, or pentaerythritol; an epoxy compound having one hydroxyl group at the molecular end, which is obtained by reacting epichlorohydrin with amino monoalcohol; and an alicyclic hydrocarbon monoepoxide having one hydroxyl group in the molecule (for example, epoxidized tetrahydrobenzyl alcohol).

As the alkoxysilane partial condensate (II), those obtained by hydrolyzing the hydrolyzable alkoxysilane monomer represented by the following Formula (4)

$$R^1{}_m Si(OR^2)_{(4-m)} \quad (4)$$

(in the formula, m represents an integer of 0 or 1, $R^1$ represents an alkyl group or aryl group having 8 or less carbon atoms, and $R^2$ represents a lower alkyl group having 4 or less carbon atoms.) in the presence of an acid or base catalyst, and water, and partially condensing the resultant hydrolyzate are used.

Specific examples of the hydrolyzable alkoxysilane monomer that is a constituent material of the alkoxysilane partial condensate (II) include tetraalkoxysilanes such as tetramethoxysilane, tetraethoxysilane, tetrapropoxysilane, and tetraisopropoxysilane; and trialkoxysilanes such as methyltrimethoxysilane, methyltriethoxysilane, methyltripropoxysilane, methyltributoxysilane, ethyltrimethoxysilane, ethyltriethoxysilane, n-propyltrimethoxysilane, n-propyltriethoxysilane, isopropyltrimethoxysilane, and isopropyltriethoxysilane.

The epoxy group-containing alkoxysilane partial condensate (II) can be obtained by a dealcoholization reaction of an epoxy compound (A) and an alkoxysilane partial condensate (II). The use ratio of the epoxy compound (A) to the alkoxysilane partial condensate (II) is not particularly limited as long as being a ratio at which the alkoxy group substantially remains.

As the reaction of the alkoxysilane partial condensate (II) and the epoxy compound (A), for example, each of these components is charged, and then a dealcoholization reaction is performed while heating and distilling off the generated alcohol.

In addition, in the dealcoholization reaction of the alkoxysilane partial condensate (II) and the epoxy compound (A), in order to promote the reaction, a catalyst that does not serve for a ring-opening of an epoxy ring can be used among the conventionally known transesterification catalysts of ester and hydroxyl group. Examples of the catalyst include, for example, a metal such as lithium, sodium, potassium, rubidium, cesium, magnesium, calcium, barium, strontium, zinc, aluminum, titanium, cobalt, germanium, tin, lead, antimony, arsenic, cerium, boron, cadmium, and manganese; and an oxide, an organic acid salt, a halide, or an alkoxide of these metals. Among them, in particular, organic tin, and organic acid tin are preferred, and specifically dibutyltin dilaurate, tin octylate, or the like is effectively used.

The alkoxy group-containing silane-modified polyamic acid that is an intended product of the present invention can be obtained by a reaction of, for example, polyamic acid (I) and an epoxy group-containing alkoxysilane partial condensate (II). The use ratio of the polyamic acid (I) to the epoxy group-containing alkoxysilane partial condensate (II) is not particularly limited, but the ratio of (the equivalent of the epoxy group of an epoxy group-containing alkoxysilane partial condensate (II))/(the equivalent of the carboxylic acid group of the tetracarboxylic acids used for polyamic acid (I)) is preferably in the range of from 0.01 to 0.4. When the above-described numerical value is less than 0.01, there is a tendency that the effect of the present invention is difficult to obtain.

2. Conductive Polymer

[Conductive Polymer]

The conductive polymer contained in the coated films of the lithium-nickel composite oxide particles according to the present invention is the designation of a high molecular compound having electrical conductivity. This high molecular compound is characterized by having a structure in which a double bond and a single bond are alternately arranged in the molecular structure, that is, having the main chain with developed π conjugation. In addition to the conductive polymer, in general, a carrier is generated by doping an acceptor molecule or a donor molecule, which is called a dopant, and electrical conductivity is developed. Examples of the dopant include, for example, an alkali metal ion such as $Li^+$, $Na^+$, $K^+$, and $Cs^+$, an alkyl ammonium ion such as tetraethylammonium, halogens, Lewis acid, protons, and a transition metal halide.

The conductive polymer is a polymer in which π conjugation has been highly developed as represented by polyacetylene, and does not dissolve in any solvent, does not have a melting point, and has a so-called insoluble and infusible nature. Therefore, processability is poor and industrial applications have been difficult.

However, according to a recent study, a conductive polymer obtained substantially or apparently as a solution has been developed, by dissolving the conductive polymer into an organic solvent or by dispersing the conductive polymer into a water solvent, and thus has been widely used in industrial applications.

Hereinafter, the present invention will be described in detail by examples. The first example is a method of providing organic solvent solubility or water solubility by directly introducing a substituent into a monomer constituting the conductive polymer. When described specifically, it is known that a polythiophene derivative synthesized from poly-3-alkyl-substituted thiophene to which an alkyl group has been introduced at the 3-position of thiophene is dissolved in an organic solvent such as chloroform, and methylene chloride, and has a melting point before decomposition, that is, is melted and dissolved. In addition, a polythiophene derivative synthesized from poly-3-alkyl sulfonic acid thiophene to which alkyl sulfonic acid has been introduced at the 3-position obtains water solubility from a sulfo group that is compatible with water, and can result in self doping at the same time.

Further, the second example is a method of using a water-soluble dopant. By introducing a polymer having a sulfo group that is compatible with water in the molecule together with a dopant and water dispersant, the conductive polymer can be finely dispersed in water. When specifically described, a monomer constituting the conductive polymer is subjected to an oxidative polymerization in an aqueous solution of a water-soluble polymer. At this time, a conductive polymer is doped with part of the sulfo groups having a water-soluble polymer, and further the water-soluble polymer and the conductive polymer are integrated with each other, and a water-soluble conductive polymer is obtained from the remaining sulfo groups. The conductive polymer can be finely dispersed in water at a level of several tens nm. The representative example is PEDOT/PSS developed by using polystyrene sulfonic acid (PSS), and using 3,4-ethylene dioxythiophene (EDOT) for the conductive polymer monomer.

As the high molecular compound that can be used in the present invention, for example, a polypyrrole-based compound, a polyaniline-based compound, a polythiophene compound, a poly(p-phenylene) compound, a polyfluorene compound, or a derivative thereof can be mentioned. Because the present invention passes through a process of dissolving or dispersing a conductive polymer into a solvent, for example, lignin graft type polyaniline in which PEDOT/PSS or lignin has been modified at the end of the polyaniline, or the like, which is enhanced in terms of solubility or dispersibility, can be preferably used.

In addition, the coating amount of the polymer or copolymer in the total amount of the coated particle according to the present invention, which is coated with the mixture of a non-electron conductive polymer being a polymer or copolymer including at least one kind selected from the group consisting of a modified polyolefin resin, a polyester resin, a polyphenol resin, a polyurethane resin, an epoxy resin, and a derivative thereof, and an electron conductive polymer being a polymer or copolymer including at least one kind selected from the group consisting of polypyrrole, polyaniline, polythiophene, poly(p-phenylene), polyfluorene, and a derivative thereof,
is preferably 0.1 to 5.0% by mass, and more preferably 0.2 to 1.0% by mass based on 100% by mass of the nickel-based lithium-nickel composite oxide particles. When the coating amount is less than 0.1% by mass, the processing tends to be insufficient, and when the coating amount exceeds 5.0% by mass, the packing density of particles is lowered by the polymer or copolymer that is not involved in the particles coating, and an adverse effect may be exerted during the production of positive electrodes.

In addition, the coating amount of the mixture of a non-electron conductive polymer being a polymer or copolymer including a silane-modified resin or a derivative thereof, and an electron conductive polymer being a polymer or copolymer including at least one kind selected from the group consisting of polypyrrole, polyaniline, polythiophene, poly(p-phenylene), polyfluorene, and a derivative thereof is preferably 0.05 to 5.0% by mass, and more preferably 0.1 to 1.0% by mass based on 100% by mass of the nickel-based lithium-nickel composite oxide particles. When the coating amount is less than 0.05% by mass, the processing tends to be insufficient, and when the coating amount exceeds 5.0% by mass, the packing density of particles is lowered by the polymer or copolymer that is not involved in the particles coating, and an adverse effect may be exerted during the production of positive electrodes.

In addition, the proportion of the non-electron conductive polymer in the mixed film of the polymer or copolymer of a non-electron conductive polymer and the polymer or copolymer of an electron conductive polymer is preferably 30% by mass to 80% by mass. When the proportion is less than 30% by mass, the material cost tends to be increased, and when the proportion exceeds 80% by mass, the electron conductivity of the coated film tends to be decreased.

In addition, the proportion of the electron conductive polymer in the mixed film of the polymer or copolymer is preferably 20% by mass to 70% by mass. When the proportion is less than 20% by mass, the electron conductivity of the coated film tends to be decreased, and when the proportion exceeds 70% by mass, the material cost tends to be increased.

[Nickel-Based Lithium-Nickel Composite Oxide Particles]

The nickel-based lithium-nickel composite oxide particles are spherical particles, and have the average particle diameter preferably of from 5 to 20 μm. When the average particle diameter is set in the range, favorable battery performance is provided as the lithium-nickel composite oxide particles, and further favorable battery repetition life (cycle characteristics) is also provided, both can be achieved, therefore, this is preferred.

In addition, the nickel-based lithium-nickel composite oxide particles are preferably represented by the following Formula (1).

$$Li_xNi_{(1-y-z)}M_yN_zO_2 \quad (1)$$

in the formula, x is a value of 0.80 to 1.10, y is a value of 0.01 to 0.20, z is a value of 0.01 to 0.15, and 1-y-z is a value exceeding 0.65, and M represents at least one element selected from Co or Mn, and N represents at least one element selected from Al, In or Sn.

Further, the value of 1-y-z (nickel content) is, from the viewpoint of the capacity, preferably a value exceeding 0.70, and more preferably a value exceeding 0.80.

The cobalt-based (LCO), the ternary (NCM), and the nickel-based (NCA) have an electrode energy density (Wh/L) of 2160 Wh/L (LiCoO$_2$), 2018.6 Wh/L (LiNi$_{0.33}$Co$_{0.33}$Mn$_{0.33}$Co$_{0.33}$O$_2$), and 2376 Wh/L (LiNi$_{0.8}$Co$_{0.15}$Al$_{0.05}$O$_2$), respectively. Accordingly, by using the nickel-based lithium-nickel composite oxide particles as a positive-electrode active substance of a lithium-ion battery, a battery having high capacity can be prepared.

[Method for Producing Coated Lithium-Nickel Composite Oxide Particles]

Various methods can be employed for producing coated lithium-nickel composite oxide particles, that is, as the method for coating with the mixture of a non-electron conductive polymer, which becomes a shell for nickel-based lithium-nickel composite oxide particles, being a polymer or copolymer including at least one kind selected from the group consisting of a modified polyolefin resin, a polyester resin, a polyphenol resin, a polyurethane resin, an epoxy resin, a silane-modified resin, and a derivative thereof, and an electron conductive polymer being a polymer or copolymer including at least one kind selected from the group consisting of polypyrrole, polyaniline, polythiophene, poly(p-phenylene), polyfluorene, and a derivative thereof.

For example, a method in which a polymer or copolymer is dissolved or dispersed in a good solvent to the polymer composition containing a non-electron conductive polymer and an electron conductive polymer, and into the resultant mixture, particles are further mixed to prepare a slurry, and then a poor solvent to the polymer or copolymer is added in a stepwise manner and washed, the good solvent is thoroughly removed, and the polymer or copolymer is deposited on particle surfaces, a so-called phase separation method, can be used for the production.

In addition, a method in which a polymer or copolymer is dissolved or dispersed in a good solvent to the polymer composition containing a non-electron conductive polymer and an electron conductive polymer, which becomes a shell, and particles becoming cores are mixed into the resultant mixture to prepare a slurry,
into this slurry, a poor solvent to the polymer or copolymer is added and mixed,
and then the good solvent is gradually removed, and the polymer or copolymer is precipitated on particle surfaces, a so-called interfacial precipitation method, can also be used for the production.

Further, a method in which particles becoming cores are dispersed in a solution in which the polymer composition containing a non-electron conductive polymer and an electron conductive polymer has been dissolved or dispersed, and droplets are finely dispersed and sprayed in hot air, a so-called air drying method or a spray drying method can also be used for the production.

Furthermore, a method in which particles becoming cores are allowed to flow by a rolling pan, a solution in which the polymer composition containing a non-electron conductive polymer and an electron conductive polymer has been dissolved or dispersed is sprayed onto the particles, and the particle surfaces are uniformly coated with the polymer or copolymer and dried, a so-called pan coating method, can also be used for the production.

Moreover, a method in which particles becoming cores are circulated up and down in a gas blown from the bottom, a solution in which the polymer composition containing a non-electron conductive polymer and an electron conductive polymer has been dissolved or dispersed is sprayed onto the particles, a so-called gas suspension coating method, can also be used for the production.

Among them, from the viewpoint of the production cost, the above-described interfacial precipitation method can be most preferably used for the production. In addition, alkoxy groups are reacted with each other by adding a hydrolysis reaction with a steam treatment to the particles coated with the above-described silane-modified resin, and stronger coated films can be formed.

Further, a curing agent may also be separately added to the resin coating the nickel-based lithium-nickel composite oxide particles, and the resultant resin is subjected to a crosslinking treatment. Examples of the curing agent include, for example, an amine-based curing agent, a polyamide-based curing agent, and a melamine-based curing agent.

EXAMPLES

Hereinafter, Examples of the present invention will be specifically described with Comparative Examples. However, the present invention should not be limited to the following Examples.

Example 1

0.07 g (solid content: 35.7%) of a modified polyethylene resin solution and 0.025 g of lignin graft type powder, polyaniline (emeraldine salt) manufactured by Sigma-Aldrich Co. LLC were dissolved in 150 g of ethanol, and into the resultant mixture, 16 g of toluene was further added and mixed to prepare a coating solution. This solution was transferred to a flask, and as nickel-based lithium-nickel composite oxide particles, 25 g of the composite oxide particles represented by the transition metal composition of $Li_{1.03}Ni_{0.82}Co_{0.15}Al_{0.03}$ was placed in the flask and mixed to prepare a slurry. Next, the flask in which the slurry had been placed was connected with an evaporator, and under reduced pressure, the flask part was placed in a water bath warmed to 45° C. and the ethanol was removed while rotating the flask. Subsequently, the preset temperature of the water bath was set to 60° C., and the toluene was removed. In the end, in order to remove the solvent thoroughly, the powder was transferred to a vacuum dryer, and dried at 100° C. for two hours under reduced pressure to prepare processed powder.

Using the nickel-based lithium-nickel composite oxide coated with a mixture in which modified polyethylene and lignin graft type polyaniline had been contained respectively at a ratio of 50% by mass in an amount of 0.2% by mass relative to the nickel-based lithium-nickel composite oxide as the coated lithium-nickel composite oxide particles according to Example 1, the following stability test in air, gelation test, and battery characteristics test (such as a charge and discharge test, and a cycle test) were performed.

Example 2

Into a solution in which 0.07 g (solid content: 35.5%) of a polyester resin solution (product name: ARAKYD 7005N) manufactured by Arakawa Chemical Industries, Ltd. had been dissolved in 75 g of toluene, a solution in which 0.025 g of lignin graft type powder, polyaniline (emeraldine salt) manufactured by Sigma-Aldrich Co. LLC had been dissolved in 75 g of ethanol was mixed, and into the resultant mixture, 16 g of isopropyl alcohol was further added and mixed to prepare a coating solution. This solution was transferred to a flask, and as nickel-based lithium-nickel composite oxide particles, 25 g of the composite oxide particles represented by the transition metal composition of $Li_{1.03}Ni_{0.82}Co_{0.15}Al_{0.03}$ was placed in the flask and mixed to prepare a slurry. Next, the flask in which the slurry had been placed was connected with an evaporator, and under reduced pressure, the flask part was placed in a water bath warmed to 60° C. and the solvent was removed while rotating the flask. In the end, in order to remove the solvent thoroughly, the powder was transferred to a vacuum dryer, and dried at 100° C. for two hours under reduced pressure to prepare processed powder.

Using the nickel-based lithium-nickel composite oxide coated with a mixture in which polyester and lignin graft type polyaniline had been contained respectively at a ratio of 50% by mass in an amount of 0.2% by mass relative to the nickel-based lithium-nickel composite oxide as the coated lithium-nickel composite oxide particles according to Example 2, the following stability test in air, gelation test, and battery characteristics test (such as a charge and discharge test, and a cycle test) were performed.

Example 3

Into a solution in which 0.05 g (solid content: 50.0%) of a polyphenol resin solution (product name: ARAKYD 7104) manufactured by Arakawa Chemical Industries, Ltd. had been dissolved in 75 g of xylene, a solution in which 0.025 g of lignin graft type powder, polyaniline (emeraldine salt) manufactured by Sigma-Aldrich Co. LLC had been dissolved in 75 g of ethanol was mixed, and into the resultant mixture, 16 g of isopropyl alcohol was further added and mixed to prepare a coating solution. This solution was transferred to a flask, and as nickel-based lithium-nickel composite oxide particles, 25 g of the composite oxide particles represented by the transition metal composition of $Li_{1.03}Ni_{0.82}Co_{0.15}Al_{0.03}$ was placed in the flask and mixed to prepare a slurry. Next, the flask in which the slurry had been placed was connected with an evaporator, and under reduced pressure, the flask part was placed in a water bath warmed to 60° C. and the solvent was removed from the slurry while rotating the flask. Subsequently, the preset temperature of the water bath was set to 60° C., and the toluene was removed. In the end, in order to remove the solvent thoroughly, the powder was transferred to a vacuum dryer, and dried at 100° C. for two hours under reduced pressure to prepare processed powder.

Using the nickel-based lithium-nickel composite oxide coated with a mixture in which a polyphenol resin and lignin graft type polyaniline had been contained respectively at a ratio of 50% by mass in an amount of 0.2% by mass relative to the nickel-based lithium-nickel composite oxide as the coated lithium-nickel composite oxide particles according to Example 3, the following stability test in air, gelation test, and battery characteristics test (such as a charge and discharge test, and a cycle test) were performed.

Example 4

Into a solution in which 0.09 g (solid content: 28.3%) of a polyurethane resin solution (product name: TSP-2242) manufactured by Arakawa Chemical Industries, Ltd. had been dissolved in 75 g of acetone, a solution in which 0.025 g of lignin graft type powder, polyaniline (emeraldine salt) manufactured by Sigma-Aldrich Co. LLC had been dissolved in 75 g of ethanol was mixed, and into the resultant mixture, 16 g of toluene was further added to prepare a coating solution. This solution was transferred to a flask, and as nickel-based lithium-nickel composite oxide particles, 25 g of the composite oxide particles represented by the transition metal composition of $Li_{1.03}Ni_{0.82}Co_{0.15}Al_{0.03}$ was placed in the flask and mixed to prepare a slurry. The flask in which the slurry had been placed was connected with an evaporator, and under reduced pressure, the flask part was placed in a water bath warmed to 45° C. and the acetone and the ethanol were removed while rotating the flask. Subsequently, the preset temperature of the water bath was set to 60° C., and the toluene was removed. In the end, in order to remove the solvent thoroughly, the powder was transferred to a vacuum dryer, and dried at 100° C. for two hours under reduced pressure to prepare processed powder.

Using the nickel-based lithium-nickel composite oxide coated with a mixture in which a polyurethane resin and lignin graft type polyaniline had been contained respectively at a ratio of 50% by mass in an amount of 0.2% by mass relative to the nickel-based lithium-nickel composite oxide as the coated lithium-nickel composite oxide particles according to Example 4, the following stability test in air, gelation test, and battery characteristics test (such as a charge and discharge test, and a cycle test) were performed.

Example 5

Into a solution in which 0.06 g (solid content: 40.0%) of an epoxy resin solution (product name: ARAKYD 9201N) manufactured by Arakawa Chemical Industries, Ltd. had been dissolved in 75 g of butyl cellosolve, a solution in which 0.025 g of lignin graft type powder, polyaniline (emeraldine salt) manufactured by Sigma-Aldrich Co. LLC had been dissolved in 75 g of ethanol was mixed, and into the resultant mixture, 16 g of toluene was further added to prepare a coating solution. This solution was transferred to a flask, and as nickel-based lithium-nickel composite oxide particles, 25 g of the composite oxide particles represented by the transition metal composition of $Li_{1.03}Ni_{0.82}Co_{0.15}Al_{0.03}$ was placed in the flask and mixed to prepare a slurry. The flask in which the slurry had been placed was connected with an evaporator, and under reduced pressure, the flask part was placed in a water bath warmed to 60° C. and the solvent was removed while rotating the flask. In the end, in order to remove the solvent thoroughly, the powder was transferred to a vacuum dryer, and dried at 100° C. for two hours under reduced pressure to prepare processed powder.

Using the nickel-based lithium-nickel composite oxide coated with a mixture in which an epoxy resin and lignin graft type polyaniline had been contained respectively at a ratio of 50% by mass in an amount of 0.2% by mass relative to the nickel-based lithium-nickel composite oxide as the coated lithium-nickel composite oxide particles according to Example 5, the following stability test in air, gelation test, and battery characteristics test (such as a charge and discharge test, and a cycle test) were performed.

Example 6

0.0313 g (solid content: 40%) of a silane-modified polyether resin solution and 0.0125 g of lignin graft type powder, polyaniline (emeraldine salt) manufactured by Sigma-Aldrich Co. LLC were dissolved in 150 g of ethanol, and into the resultant mixture, 16 g of toluene was further added and mixed to prepare a coating solution. This solution was transferred to a flask, and as nickel-based lithium-nickel composite oxide particles, 25 g of the composite oxide particles represented by the transition metal composition of $Li_{1.03}Ni_{0.82}Co_{0.15}Al_{0.03}$ was placed in the flask and mixed to prepare a slurry. Next, the flask in which the slurry had been placed was connected with an evaporator, and under reduced pressure, the flask part was placed in a water bath warmed to 60° C. and the solvent was removed while rotating the flask. After that, a steam treatment was performed, and in the end, in order to remove the solvent thoroughly, the powder was transferred to a vacuum dryer, and dried at 100° C. for two hours under reduced pressure to prepare processed powder.

Using the nickel-based lithium-nickel composite oxide coated with a mixture in which silane-modified polyether and lignin graft type polyaniline had been contained respectively at a ratio of 50% by mass in an amount of 0.1% by mass relative to the nickel-based lithium-nickel composite oxide as the coated lithium-nickel composite oxide particles according to Example 6, the following stability test in air, gelation test, and battery characteristics test (such as a charge and discharge test, and a cycle test) were performed.

Example 7

Into a solution in which 0.0364 g (solid content: 34.3%) of a silane-modified polyester resin solution had been dissolved in 75 g of toluene, a solution in which 0.0125 g of lignin graft type powder, polyaniline (emeraldine salt) manufactured by Sigma-Aldrich Co. LLC had been dissolved in 75 g of ethanol was mixed, and into the resultant mixture, 16 g of isopropyl alcohol was further added and mixed to prepare a coating solution. This solution was transferred to a flask, and as nickel-based lithium-nickel composite oxide particles, 25 g of the composite oxide particles represented by the transition metal composition of $Li_{1.03}Ni_{0.82}Co_{0.15}Al_{0.03}$ was placed in the flask and mixed to prepare a slurry. Next, the flask in which the slurry had been placed was connected with an evaporator, and under reduced pressure, the flask part was placed in a water bath warmed to 60° C. and the solvent was removed while rotating the flask. After that, a steam treatment was performed, and in the end, in order to remove the solvent thoroughly, the powder was transferred to a vacuum dryer, and dried at 100° C. for two hours under reduced pressure to prepare processed powder.

Using the nickel-based lithium-nickel composite oxide coated with a mixture in which silane-modified polyester and lignin graft type polyaniline had been contained respectively at a ratio of 50% by mass in an amount of 0.1% by mass relative to the nickel-based lithium-nickel composite oxide as the coated lithium-nickel composite oxide particles according to Example 7, the following stability test in air, gelation test, and battery characteristics test (such as a charge and discharge test, and a cycle test) were performed.

Example 8

Into a solution in which 0.0147 g (solid content: 85.3%) of a silane-modified polyphenol resin solution (product name: COMPOCERAN P501) manufactured by Arakawa Chemical Industries, Ltd. had been dissolved in 75 g of acetone, a solution in which 0.0125 g of lignin graft type powder, polyaniline (emeraldine salt) manufactured by Sigma-Aldrich Co. LLC had been dissolved in 75 g of ethanol was mixed, and into the resultant mixture, 16 g of toluene was further added and mixed to prepare a coating solution. This solution was transferred to a flask, and as nickel-based lithium-nickel composite oxide particles, 25 g of the composite oxide particles represented by the transition metal composition of $Li_{1.03}Ni_{0.82}Co_{0.15}Al_{0.03}$ was placed in the flask and mixed to prepare a slurry. Next, the flask in which the slurry had been placed was connected with an evaporator, and under reduced pressure, the flask part was placed in a water bath warmed to 45° C. and the acetone and the ethanol were removed from the slurry while rotating the flask. Subsequently, the preset temperature of the water bath was set to 60° C., and the toluene was removed. After that, a steam treatment was performed, and in order to remove the solvent thoroughly, the powder was transferred to a vacuum dryer, and dried at 100° C. for two hours under reduced pressure to prepare processed powder.

Using the nickel-based lithium-nickel composite oxide coated with a mixture in which a silane-modified polyphenol resin and lignin graft type polyaniline had been contained respectively at a ratio of 50% by mass in an amount of 0.1% by mass relative to the nickel-based lithium-nickel composite oxide as the coated lithium-nickel composite oxide particles according to Example 8, the following stability test in air, gelation test, and battery characteristics test (such as a charge and discharge test, and a cycle test) were performed.

Example 9

Into a solution in which 0.0414 g (solid content: 30.2%) of a silane-modified polyurethane resin solution (product name: UREARNO U201) manufactured by Arakawa Chemical Industries, Ltd. had been dissolved in 75 g of methyl ethyl ketone, a solution in which 0.0125 g of lignin graft type powder, polyaniline (emeraldine salt) manufactured by Sigma-Aldrich Co. LLC had been dissolved in 75 g of ethanol was mixed, and into the resultant mixture, 16 g of toluene was further added to prepare a coating solution. This solution was transferred to a flask, and as nickel-based lithium-nickel composite oxide particles, 25 g of the composite oxide particles represented by the transition metal composition of $Li_{1.03}Ni_{0.82}Co_{0.15}Al_{0.03}$ was placed in the flask and mixed to prepare a slurry. The flask in which the slurry had been placed was connected with an evaporator, and under reduced pressure, the flask part was placed in a water bath warmed to 45° C. and the acetone and the ethanol were removed while rotating the flask. Subsequently, the preset temperature of the water bath was set to 60° C., and the toluene was removed. After that, a steam treatment was performed, and in the end, in order to remove the solvent thoroughly, the powder was transferred to a vacuum dryer, and dried at 100° C. for two hours under reduced pressure to prepare processed powder.

Using the nickel-based lithium-nickel composite oxide coated with a mixture in which a silane-modified polyurethane resin and lignin graft type polyaniline had been contained respectively at a ratio of 50% by mass in an amount of 0.1% by mass relative to the nickel-based lithium-nickel composite oxide as the coated lithium-nickel composite oxide particles according to Example 9, the following stability test in air, gelation test, and battery characteristics test (such as a charge and discharge test, and a cycle test) were performed.

Example 10

Into a solution in which 0.0138 g (solid content: 90.5%) of a silane-modified epoxy resin solution (product name: HBEP195) manufactured by Arakawa Chemical Industries, Ltd. had been dissolved in 75 g of acetone, a solution in which 0.0125 g of lignin graft type powder, polyaniline (emeraldine salt) manufactured by Sigma-Aldrich Co. LLC had been dissolved in 75 g of ethanol was mixed, and into the resultant mixture, 16 g of isopropyl alcohol was further added to prepare a coating solution. This solution was transferred to a flask, and as nickel-based lithium-nickel composite oxide particles, 25 g of the composite oxide particles represented by the transition metal composition of $Li_{1.03}Ni_{0.82}Co_{0.15}Al_{0.03}$ was placed in the flask and mixed to prepare a slurry. The flask in which the slurry had been placed was connected with an evaporator, and under reduced pressure, the flask part was placed in a water bath warmed to 45° C. and the acetone and the ethanol were removed from the slurry while rotating the flask.

Subsequently, the preset temperature of the water bath was set to 60° C., and the isopropyl alcohol was removed. After that, a steam treatment was performed, and in the end, in order to remove the solvent thoroughly, the powder was transferred to a vacuum dryer, and dried at 100° C. for two hours under reduced pressure to prepare processed powder.

Using the nickel-based lithium-nickel composite oxide coated with a mixture in which a silane-modified epoxy resin and lignin graft type polyaniline had been contained respectively at a ratio of 50% by mass in an amount of 0.1% by mass relative to the nickel-based lithium-nickel composite oxide as the coated lithium-nickel composite oxide particles according to Example 10, the following stability test in air, gelation test, and battery characteristics test (such as a charge and discharge test, and a cycle test) were performed.

Example 11

Into a solution in which 0.0833 g (solid content: 15%) of a silane-modified polyamide resin solution (product name: COMPOCERAN H850D) manufactured by Arakawa Chemical Industries, Ltd. had been dissolved in 75 g of dimethylacetamide, a solution in which 0.0125 g of lignin graft type powder, polyaniline (emeraldine salt) manufactured by Sigma-Aldrich Co. LLC had been dissolved in 75 g of dimethylacetamide was mixed, and into the resultant mixture, 16 g of isopropyl alcohol was further added to prepare a coating solution. This solution was transferred to a flask, and as nickel-based lithium-nickel composite oxide particles, 25 g of the composite oxide particles represented by the transition metal composition of $Li_{1.03}Ni_{0.82}Co_{0.15}Al_{0.03}$ was placed in the flask and mixed to prepare a slurry. The flask in which the slurry had been placed was connected with an evaporator, and under reduced pressure, the flask part was placed in a water bath warmed to 80° C. and the dimethylacetamide was removed from the slurry while rotating the flask. After that, a steam treatment was performed, and in the end, in order to remove the solvent thoroughly, the powder was transferred to a vacuum dryer, and dried at 100° C. for two hours under reduced pressure to prepare processed powder.

Using the nickel-based lithium-nickel composite oxide coated with a mixture in which a silane-modified polyamide resin and lignin graft type polyaniline had been contained respectively at a ratio of 50% by mass in an amount of 0.1% by mass relative to the nickel-based lithium-nickel composite oxide as the coated lithium-nickel composite oxide particles according to Example 11, the following stability test in air, gelation test, and battery characteristics test (such as a charge and discharge test, and a cycle test) were performed.

Comparative Example 1

The stability test in air, the gelation test, and the battery characteristics test were performed in the same manner as in Examples 1 to 11 except for using lithium-nickel composite oxide particles that had not been processed.
<Stability Test in Air>
2.0 g of lithium-nickel composite oxide particles according to each of the Examples and Comparative Example was each put into a separate glass bottle, the glass bottles were left to stand in a thermostat at a temperature of 30° C. and humidity of 70% for one week, the increased mass was measured as compared to the initial mass, and the change rate per particles mass was calculated. By setting the change rate per particles mass of the lithium-nickel composite oxide particles after the lapse of one week according to Comparative Example 1 to 100, the change rate on every day of each of Examples 1 to 11 and Comparative Example 1 was shown in FIGS. 1 and 3.

Figure 3:
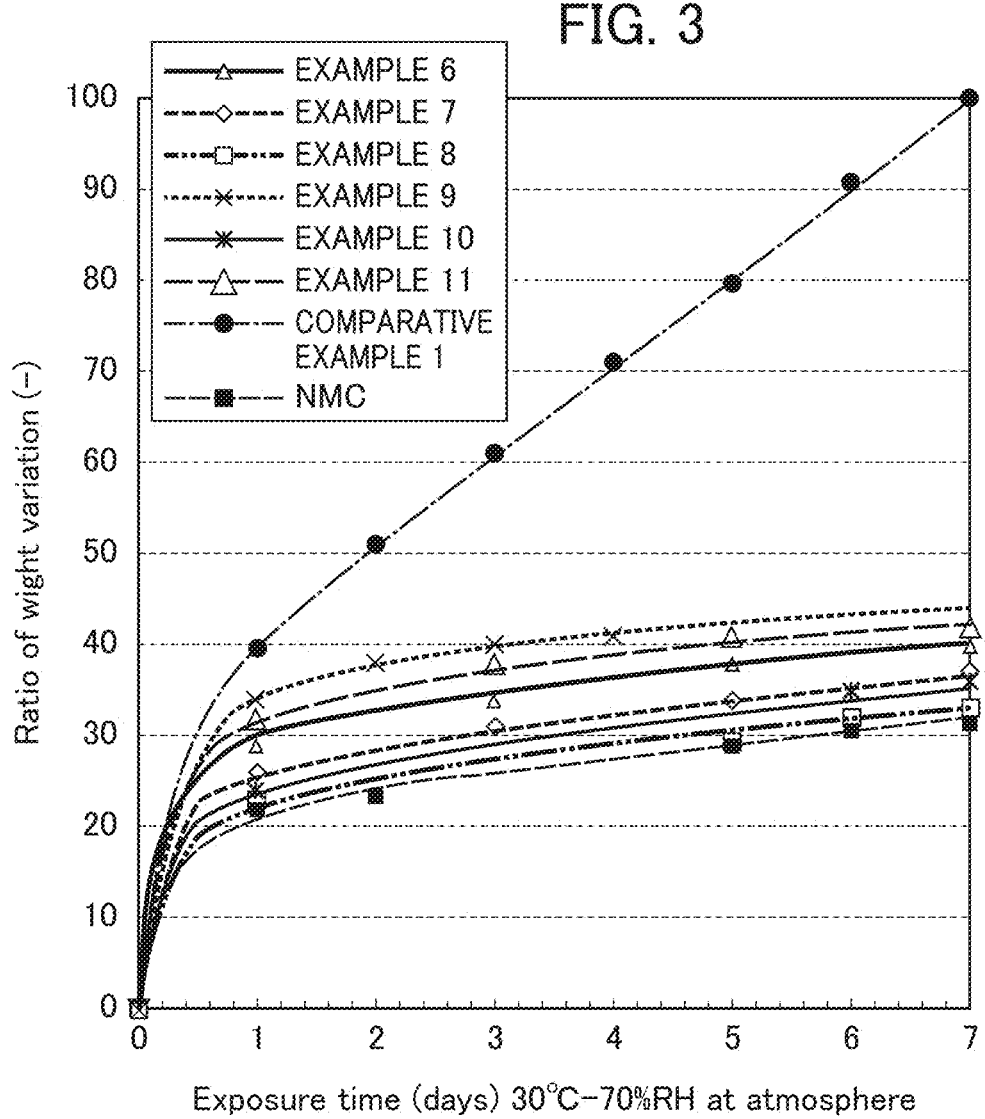
FIG. 3 shows a change rate per particles mass in a case after standing for one week in Examples 6 to 11 and Comparative Example.

As can be seen from FIGS. 1 and 3, each of the coated lithium-nickel composite oxide particles of the modified polyethylene resin/lignin graft type polyaniline mixture, the polyester resin/lignin graft type polyaniline mixture, the polyurethane resin/lignin graft type polyaniline mixture, the polyphenol resin/lignin graft type polyaniline mixture, the epoxy resin/lignin graft type polyaniline mixture, the silane-modified polyether resin/lignin graft type polyaniline mixture, the silane-modified polyester resin/lignin graft type polyaniline mixture, the silane-modified polyphenol resin/lignin graft type polyaniline mixture, the silane-modified polyurethane resin/lignin graft type polyaniline mixture, the silane-modified epoxy resin/lignin graft type polyaniline mixture, and the silane-modified polyamide resin/lignin graft type polyaniline mixture of Examples from 1 to 11 had a small change rate per mass as compared to that of the lithium-nickel composite oxide particles in Comparative Example 1, which had not been coated with the polymer. From this result, it was confirmed that by coating the particles with the polymer, the permeation of moisture and carbon dioxide in the air can be suppressed.

<Gelation Test>

As to the measurement of change over time of the viscosity of the positive electrode mixture slurry, a positive electrode mixture slurry was prepared in the following order, and then the increase of viscosity and the gelation were observed.

As for the mixing ratio, a lithium-nickel composite oxide particles according to the Examples and Comparative Example, a conductive auxiliary, a binder, N-methyl-2-pyrrolidone (NMP) were weighed so that the mass ratio of the lithium-nickel composite oxide particles:the conductive auxiliary:the binder:the NMP was 45:2.5:2.5:50, further 1.5% by mass of water was added, then the resultant mixture was stirred by a rotation-revolution mixer, and a positive electrode mixture slurry was obtained. The obtained slurry was stored in an incubator at 25° C., and the changes over time of the viscosity increase and the degree of gelation in the Examples and Comparative Example 1 were confirmed, respectively, by stir mixing the slurry with a spatula. The slurry was stored until obtaining complete gelation.

It took six days for the slurry according to each of Examples 1 and 4 to reach the complete gelation, it took eight days for the slurry according to each of Examples 2, 3 and 5 to reach the complete gelation, it took eight or more days for the slurry according to Example 6 to reach the complete gelation, it took five or more days for the slurry according to Examples 7 and 11 to reach the complete gelation, it took nine days for the slurry according to Example 8 to reach the complete gelation, and it took 14 or more days for the slurry according to each of Examples 9 and 10 to reach the complete gelation. On the other hand, it took one day for the slurry according to Comparative Example 1 to reach complete gelation. From these results, it was confirmed that in the slurry according to each of Examples 1 to 11, by coating the lithium-nickel composite oxide particles with the above-described polymer, the generation of impurities such as lithium hydroxide (LiOH) and lithium carbonate ($Li_2Co_3$) is suppressed, the dissolution of impurities into the slurry is suppressed, and the slurry can be prevented from being gelated and increasing the slurry viscosity due to the reaction with a binder.

In addition, in a case when the lithium-nickel composite oxide particles were coated with a fluorine compound, the fluorine compound is dissolved generally into N-methyl-2-pyrrolidone (NMP), therefore, it is considered that even though the lithium-nickel composite oxide particles have been coated with the fluorine compound, the coated films are dissolved during mixing the slurry. Accordingly, it is considered that the lithium-nickel composite oxide particles coated with a fluorine compound are different from the coated lithium-nickel composite oxide particles according to Examples, and it is difficult to suppress the generation of impurities when the produced positive electrode is stored as usual. Therefore, it is difficult to suppress the reaction with an electrolytic solution accompanied by gas generation in battery driving, which is caused by the impurities generated during the storage of the positive electrodes, and an expensive storage facility is required.

<Battery Characteristics Evaluation>

By the following procedures, a non-aqueous electrolyte secondary battery (lithium-ion secondary battery) for evaluation was prepared, and battery characteristics evaluation was performed.

[Production of Secondary Battery]

As for the battery characteristics evaluation of the lithium-nickel composite oxide particles of the present invention, a coin type battery and a laminate type battery were prepared, and the coin type battery was subjected to a charge and discharge capacity measurement and the laminated cell type battery was subjected to a charge and discharge cycle test and a resistance measurement.

(a) Positive Electrode

Into the obtained coated lithium-nickel composite oxide particles and lithium-nickel composite oxide particles according to the Examples and Comparative Example, an acetylene black as a conductive auxiliary, and polyvinylidene fluoride (PVdF) as a binder were mixed so that the mass ratio of the particles, the acetylene black, and the PVdF was 85:10:5, and the resultant mixture was dissolved into an N-methyl-2-pyrrolidone (NMP) solution to prepare a positive electrode mixture slurry An aluminum foil was coated with the positive electrode mixture slurry by a comma coater and heated at 100° C. and dried, as a result of which a positive electrode was obtained. A load was applied to the obtained positive electrode through a roll press machine, and a positive electrode sheet in which the positive electrode density had been improved was prepared. This positive electrode sheet was punched out for the evaluation of the coin type battery so as to have the diameter of φ9 mm, and also cut out for the evaluation of the laminated cell type battery so as to have the size of 50 mm×30 mm, and each of the punched-out sheet and the cut-out sheet was used as a positive electrode for evaluation.

(b) Negative Electrode

Graphite as a negative electrode active substance and polyvinylidene fluoride (PVdF) as a binder were mixed so that the mass ratio of the graphite and the PVdF was 92.5:7.5, and the resultant mixture was dissolved into an N-methyl-2-pyrrolidone (NMP) solution to obtain a negative electrode mixture paste.

In the same manner as in the positive electrode, with this negative electrode mixture slurry, a copper foil was coated by a comma coater, and heated at 120° C. and dried, as a result of which a negative electrode was obtained. A load was applied to the obtained negative electrode through a roll press machine, and a negative electrode sheet in which the electrode density had been improved was prepared. The obtained negative electrode sheet was punched out for the coin type battery so as to have the diameter of φ14 mm, and also cut out for the laminated cell type battery so as to have the size of 54 mm×34 mm, and each of the punched-out sheet and the cut-out sheet was used as a negative electrode for evaluation.

(c) Coin Battery and Laminated Cell Type Battery

The prepared electrode for evaluation was dried at 120° C. for 12 hours in a vacuum dryer. By using this positive electrode, a 2032 type coin battery and a laminated cell type battery were prepared in a glove box in which the dew point was controlled at −80° C. in an argon atmosphere. For the electrolytic solution, ethylene carbonate (EC) using 1M of $LiPF_6$ as a supporting electrolyte and diethyl carbonate (DEC) (manufactured by TOMIYAMA PURE CHEMICAL INDUSTRIES, LTD.), the ratio of which was 3:7, were used, and a glass separator was used as a separator, to prepare each of the batteries for evaluation.

«Charge and Discharge Test»

The prepared coin type battery was left to stand for around 24 hours after assembly, and charged at a current density of 0.2 C rate up to a cut-off voltage of 4.3 V in a thermostat at 25° C. after the open circuit voltage (OCV) was stabilized. After one hour of rest, a charge and discharge test for measuring the discharge capacity was performed when the battery was discharged up to a cut-off voltage of 3.0 V.

The initial discharge capacity of the coin type battery according to each of Examples was 196.88 mAh/g in Example 1, 196.99 mAh/g in Example 2, 197.89 mAh/g in Example 3, 195.95 mAh/g in Example 4, 195.85 mAh/g in Example 5, 192.86 mAh/g in Example 6, 192.89 mAh/g in Example 7, 192.93 mAh/g in Example 8, 192.95 mAh/g in Example 9, 192.88 mAh/g in Example 10, and 192.32 mAh/g in Example 11, but the initial discharge capacity of the coin type battery according to Comparative Example 1 was 191.93 mAh/g.

«Cycle Test»

In the same manner as in the coin type battery, the prepared laminate type battery was left to stand for around 24 hours after the assembly, and charged at a current density of 0.2 C rate up to a cut-off voltage of 4.1 V in a thermostat at 25° C. after the open circuit voltage was stabilized. After one hour of rest, the battery was discharged up to a cut-off voltage of 3.0 V. Next, this battery was subjected to a cycle test of repeating a cycle of 4.1 V-CC charge and 3.0 V-CC discharge at a current density of 2.0 C rate in a thermostat at 60° C., and a cycle test of confirming the capacity retention rate after 500 cycles was performed. The capacity retention rate after the cycle test was, when the first cycle was set to 100%, 87.3% in Example 1, 87.2% in Example 2, 88.1% in Example 3, 86.3% in Example 4, 87.2% in Example 5, 87.3% in Example 6, 87.5% in Example 7, 88.3% in Example 8, 89.2% in Example 9, 87.5% in Example 10, and 87.1% in Example 11, but the capacity retention rate after the cycle test according to Comparative Example 1 was 80.7%.

Figure 2:
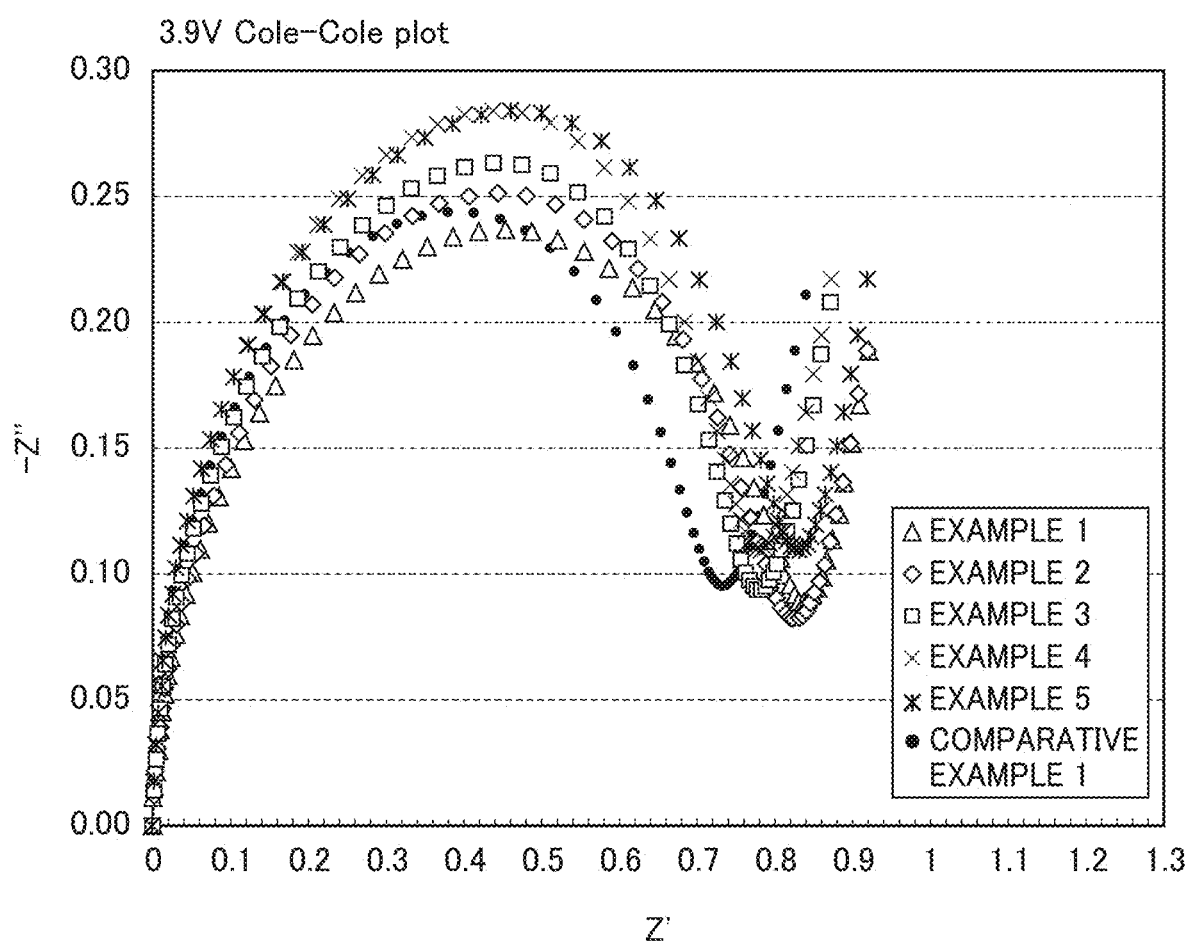
FIG. 2 shows a Cole-Cole plot by an impedance test before the cycle test in Examples 1 to 5 and Comparative Example.

In the Cole-Cole plot in impedance before the cycle test in FIGS. 2 and 4, the laminate batteries according to Example and Comparative Example were approximately equal to each other From this, it was confirmed that in the lithium-nickel composite oxide particles used for the laminate batteries of Examples, a modified polyethylene resin, a polyester resin, a polyurethane resin, a polyphenol resin, an epoxy resin, and a silane-modified resin are equivalent to or excellent as compared to the lithium-nickel composite oxide particles on which the coating treatment has not been performed, in all of the charge and discharge capacity, the battery resistance, and the cycle characteristics.

From the above, it can be understood that the coated lithium-nickel composite oxide particles according to the present invention are excellent lithium-nickel composite oxide particles for a lithium-ion battery positive-electrode active substance that is excellent in terms of environmental stability having been an problem of a lithium-nickel composite oxide particles, and has discharge capacity characteristics equivalent to or more than the high discharge capacity of the lithium-nickel composite oxide particles.

The invention claimed is:

1. Coated lithium-nickel composite oxide particles for a lithium-ion battery positive-electrode active substance, comprising:

nickel-based lithium-nickel composite oxide particles; and coated films of a polymer composition containing a non-electron conductive polymer and an electron conductive polymer coated on surfaces of the nickel-based lithium-nickel composite oxide particles, wherein the non-electron conductive polymer is a polymer or copolymer including at least one kind selected from the group consisting of a modified polyolefin resin, a polyester resin, a polyphenol resin, a polyurethane resin, an epoxy resin, a silane-modified resin, and a derivative thereof, wherein the modified polyolefin resin is a polyolefin resin modified with a modifier comprising one or more selected from the group consisting of (meth)acrylic acid, a derivative of (meth)acrylic acid, alkyl ester, glycidyl ester, an alkali metal salt of (meth)acrylic acid, a halide of (meth)acrylic acid, an amino group-containing (meth)acrylic acid derivative, di(meth)acrylate, an OH group or alkoxy group-containing (meth)acrylic acid derivative, an isocyanato group-containing (meth) acrylic acid derivative, a P-containing (meth)acrylic acid derivative, a nitrile compound, a vinyl compound, vinylbenzoic acid, a styrene derivative, a dicarboxylic acid, and a dicarboxylic acid anhydride and, wherein when the non-electron conductive polymer does not include a silane-modified resin or a derivative thereof, the coating amount of the polymer composition is 0.1 to 5.0% by mass relative to the lithium-nickel composite oxide particles, and wherein when the non-electron conductive polymer includes a silane-modified resin or a derivative thereof, the coating amount of the polymer composition is 0.05 to 5.0% by mass relative to the lithium-nickel composite oxide particles.

2. The coated lithium-nickel composite oxide particles according to claim 1, wherein the non-electron conductive polymer is a polymer or copolymer including a silane-modified resin and/or a derivative thereof, and the silane-modified resin is a polymer or copolymer including at least one kind selected from the group consisting of a silane-modified polyether resin, a silane-modified polyester resin, a silane-modified polyphenol resin, a silane-modified polyurethane resin, a silane-modified epoxy resin, and a silane-modified polyamide resin.

3. The coated lithium-nickel composite oxide particles according to claim 1, wherein the electron conductive polymer is a polymer or copolymer including at least one kind selected from the group consisting of polypyrrole, polyaniline, polythiophene, polyp-phenylene), polyfluorene, and a derivative thereof.

4. The coated lithium-nickel composite oxide particles according to claim 1, wherein the non-electron conductive polymer does not include a silane-modified resin or a derivative thereof.

5. The coated lithium-nickel composite oxide particles according to claim 1, wherein the non-electron conductive polymer includes a silane-modified resin or a derivative thereof.

6. The coated lithium-nickel composite oxide particles according to claim 1, wherein the content of the non-electron conductive polymer is 30 to 80% by mass relative to the total amount of the polymer composition.

7. The coated lithium-nickel composite oxide particles according to claim 1, wherein, the lithium-nickel composite oxide is represented by the following Formula (1),

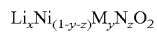
(1)

wherein x is a value of from 0.80 to 1.10, y is a value of from 0.01 to 0.20, z is a value of from 0.01 to 0.15, and 1-y-z is a value exceeding 0.65, and M represents at least one element selected from Co or Mn, and N represents at least one element selected from Al, In or Sn.

8. The coated lithium-nickel composite oxide particles according to claim 1, wherein the coated lithium-nickel composite oxide particles are spherical particles having an average particle diameter of 5 to 20 μm.

9. A method for producing the coated lithium-nickel composite oxide particles according to claim 1, comprising:
preparing a resin solution for coating by dissolving a non-electron conductive polymer and an electron conductive polymer good solvent that dissolves the non-electron conductive polymer and electron conductive polymer;
adding a poor solvent that does not dissolve the non-electron conductive polymer and the electron conductive polymer and has a evaporation rate lower than that of the good solvent into the resin solution for coating;
adding the lithium-nickel composite oxide particles into the resin solution for coating to prepare a slurry; and
removing the good solvent and the poor solvent from the slurry.

* * * * *